(12) United States Patent
Kim

(10) Patent No.: US 12,008,187 B2
(45) Date of Patent: Jun. 11, 2024

(54) DISPLAY DEVICE AND POSITION INPUT SYSTEM INCLUDING THE SAME

(71) Applicant: SAMSUNG DISPLAY CO., LTD., Yongin-si (KR)

(72) Inventor: Eun Young Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/937,483

(22) Filed: Oct. 3, 2022

(65) Prior Publication Data

US 2023/0350511 A1    Nov. 2, 2023

(30) Foreign Application Priority Data

Mar. 2, 2022  (KR) .................. 10-2022-0026748

(51) Int. Cl.
| | | |
|---|---|---|
| *G06F 3/041* | (2006.01) | |
| *G06F 3/044* | (2006.01) | |
| *G06F 3/0488* | (2022.01) | |

(52) U.S. Cl.
CPC .......... *G06F 3/0416* (2013.01); *G06F 3/0488* (2013.01); *G06F 2203/04112* (2013.01)

(58) Field of Classification Search
CPC ............ G06F 3/0416; G06F 3/0448; G06F 2203/04112; G06F 3/0412; G06F 3/0443; G06F 3/0446; G06F 3/0321; G06F 3/044; G06F 2203/04103; H10K 59/40
See application file for complete search history.

(56) References Cited

U.S. PATENT DOCUMENTS

| | | | | |
|---|---|---|---|---|
| 2012/0062250 A1* | 3/2012 | Kuo | ...................... | G06F 3/0443 324/686 |
| 2014/0062967 A1* | 3/2014 | Lu | ....................... | G06F 3/03545 200/600 |
| 2015/0123935 A1* | 5/2015 | Park | ...................... | G06F 3/0448 345/174 |

FOREIGN PATENT DOCUMENTS

| | | | | |
|---|---|---|---|---|
| CN | 108874220 B | * | 7/2021 | .......... G06F 3/0412 |
| KR | 10-2014-0126091 | | 10/2014 | |
| KR | 10-2015-0103977 | | 9/2015 | |
| KR | 10-2104027 | | 4/2020 | |
| KR | 10-2205858 | | 1/2021 | |

* cited by examiner

*Primary Examiner* — Stephen G Sherman
(74) *Attorney, Agent, or Firm* — F. CHAU & ASSOCIATES, LLC

(57) ABSTRACT

The present disclosure relates to a display device and a position input system including the same. According to an embodiment of the disclosure, a display device includes a display panel, a display unit disposed on the display panel and comprising a plurality of emission areas, a plurality of touch electrodes disposed between the plurality of emission areas and configured to sense a touch input, and a plurality of position code patterns. Each of the plurality of position code patterns is disposed to overlap a corresponding touch electrode in a position code pattern forming region. A width in a horizontal direction of the touch electrodes formed in the position code pattern forming regions is greater than a width in the horizontal direction of the position code patterns overlapping on a front surface thereof. The horizontal direction is parallel to an extending plane of the display panel.

21 Claims, 19 Drawing Sheets

CE: CEa, CEb
DPd: DP1, DP2

DISPLAY DEVICE AND POSITION INPUT SYSTEM INCLUDING THE SAME

CROSS-REFERENCE TO RELATED APPLICATION

This application claims priority under 35 U.S.C. § 119 to Korean Patent Application No. 10-2022-0026748 filed on Mar. 2, 2022 in the Korean Intellectual Property Office, the disclosure of which is hereby incorporated by reference in its entirety.

TECHNICAL FIELD

The present disclosure relates to a display device and a position input system including the same.

DISCUSSION OF THE RELATED ART

Display devices are used to facilitate the transfer of information to users. For example, display devices have been employed in various electronic devices such as smartphones, digital cameras, laptop computers, navigation devices, and smart televisions. Several types of display devices have been developed, such as organic light-emitting diode (OLED) display devices, liquid crystal display (LCD) devices, and the like. Some types of display devices, such as the OLED devices, include light emitting elements capable of emitting light. These display devices can display images without a separate backlight unit.

Some electronic devices further include touch screens coupled to the display devices. The touch screen may support a touch input using a user's body part (e.g., a finger) and a touch input using an electronic pen. In some cases, an electronic pen allows for more precise detection of input location. However, the touch input methods may use expensive computation and correction to determine the position accurately. Further, the sensors used for input may be visible under certain conditions, reducing display quality. There is a need in the art for a display device that includes a position input system with reduced computational cost and increased display quality.

SUMMARY

A display device and a position input system including the same are provided, in which a position coordinate input of the position input device such as an electronic pen may be performed using position code patterns of a display panel. Embodiments described herein also increase display quality by reducing visibility of the position code patterns. For example, some embodiments include touch electrodes with increased width within the formation regions of the position code patterns.

According to an embodiment of the disclosure, a display device includes a display panel, a display unit disposed on the display panel and comprising a plurality of emission areas; a plurality of touch electrodes disposed between the plurality of emission areas and configured to sense a touch input; and a plurality of position code patterns, wherein each of the plurality of position code patterns is disposed to overlap a corresponding touch electrode of the plurality of touch electrodes in a position code pattern forming region, wherein a width in a horizontal direction of the touch electrodes formed in the position code pattern forming regions is greater than a width in the horizontal direction of the position code patterns overlapping a front surface thereof, and wherein the horizontal direction is parallel to an extending plane of the display panel.

In an embodiment, the plurality of emission areas are arranged in a horizontal or vertical stripe structure or in a PENTILE™ matrix structure, the plurality of touch electrodes comprise a plurality of driving electrodes, a plurality of sensing electrodes, and a plurality of dummy electrodes, and the plurality of driving electrodes, the plurality of sensing electrodes, and the plurality of dummy electrodes are formed into a mesh structure, the mesh structure comprising mesh lines extending in spaces between each of the plurality of emission areas and outer sides thereof, and the position code patterns overlap the mesh structure in the position code pattern forming regions.

In an embodiment, an area of the touch electrodes formed in the position code pattern forming regions is greater than an area of the position code patterns formed to overlap the front surface thereof.

In an embodiment, a formation width in at least one direction of the position code patterns formed in the position code pattern forming regions is the same as a mesh line width of the plurality of touch electrodes formed in peripheral regions where the position code patterns are not formed.

In an embodiment, a formation width in at least one direction of the position code patterns formed in the position code pattern forming regions is smaller than a mesh line width of the touch electrodes formed in the position code pattern forming regions, and is greater than a mesh line width of the plurality of touch electrodes formed in peripheral regions where the position code patterns are not formed.

In an embodiment, a width in at least one of X-axis and Y-axis directions and first through fourth directions of the touch electrodes formed in the position code pattern forming regions is greater than widths or sizes in the X-axis and Y-axis directions and the first through fourth directions of the position code patterns formed on the front surface thereof, the X-axis and Y-axis directions are horizontal directions perpendicular to each other and parallel to the extending plane of the display panel, and the first through fourth directions are diagonal directions with respect to the X-axis and Y-axis directions.

In an embodiment, a planar code pattern shape of the position code patterns is formed in a polygonal pattern shape of at least one of a rectangular pattern, a square pattern, a rhombic pattern, a pentagonal pattern, or a hexagonal pattern, and the touch electrodes formed in the position code pattern forming regions are formed in a polygonal pattern shape of at least one of the rectangular pattern, square pattern, rhombic pattern, pentagonal pattern, or hexagonal pattern to overlap the position code patterns.

In an embodiment, a planar code pattern shape of the position code patterns has a polygonal closed loop pattern shape of at least one of a rectangular pattern, a square pattern, a rhombic pattern, a pentagonal pattern, or a hexagonal pattern surrounding at least one of the emission areas, and the touch electrodes formed in the position code pattern forming regions are formed in a polygonal closed loop pattern shape of at least one of the rectangular pattern, square pattern, rhombic pattern, pentagonal pattern, or hexagonal pattern surrounding at least one of the emission areas to overlap the position code patterns.

In an embodiment, the touch electrodes formed in the position code pattern forming regions comprise protrusions protruding in at least one horizontal direction, the protrusions are formed in a polygonal shape of at least one of a triangular shape, a square shape, or a trapezoidal shape, and a width of the touch electrodes comprising a width of the protrusions is greater than a width of the position code patterns.

In an embodiment, a planar code pattern shape of the position code patterns has a planar mesh pattern shape comprising mesh lines extending in spaces between the plurality of emission areas formed in the position code pattern forming regions and outer sides thereof, and the touch electrodes formed in the position code pattern forming regions are formed in a planar mesh pattern shape comprising mesh lines extending in spaces between the plurality of emission areas and outer sides thereof to overlap the position code patterns.

In an embodiment, a planar code pattern shape of the position code patterns has an open loop pattern shape partially surrounding outer sides of at least one emission area formed in the position code pattern forming regions, and the touch electrodes formed in the position code pattern forming regions are formed in an open loop pattern shape partially surrounding the outer sides of the at least one emission area to overlap the position code patterns.

In an embodiment, a planar code pattern shape of the position code patterns has a pattern shape of at least one of a straight or curved shape of a preset length, a cross pattern shape, or an irregular polygonal pattern shape between the plurality of emission areas formed in the position code pattern forming regions, and the touch electrodes formed in the position code pattern forming regions are formed in a pattern shape of at least one of a straight or curved shape of a preset length, a cross pattern shape, or an irregular polygonal pattern shape between the plurality of emission areas to overlap the position code patterns.

In an embodiment, dimensions of each of the position code patterns, including an area thereof, a width thereof in at least one direction, a length thereof in at least one direction, and a size thereof in at least one direction are different from dimensions of other adjacent position code patterns, and dimensions of each of the touch electrodes formed in the position code pattern forming regions, including an area, a width in at least one direction, a length in at least one direction, and a size in at least one direction are different from dimensions of the touch electrodes formed in other adjacent position code pattern forming regions.

According to an embodiment of the disclosure, a position input system includes a display device configured to display an image; and a position input device configured to input position coordinate data to the display device, wherein the display device comprises: a display panel; a display unit disposed on the display panel and comprising a plurality of emission areas; a plurality of touch electrodes disposed between the plurality of emission areas and configured to sense a touch input; and a plurality of position code patterns, wherein each of the plurality of position code patterns is disposed to overlap a corresponding touch electrode of the plurality of touch electrodes in a position code pattern forming region, wherein a width in at least one horizontal direction of the touch electrodes formed in the position code pattern forming regions is greater than a width in at least one horizontal direction of the position code patterns overlapping a front surface thereof, and wherein the horizontal direction is parallel to an extending plane of the display panel.

In an embodiment, the position input device comprises a code detector configured to detect the position code patterns, a code processor configured to receive shape data of the position code patterns from the code detector, extract data codes corresponding to a shape of the position code patterns, and generate the position coordinate data corresponding to the data codes, and a communication module configured to transmit the position coordinate data to the display device.

In an embodiment, the plurality of emission areas are arranged in a stripe structure or in a PENTILE™ matrix structure, the plurality of touch electrodes comprise a plurality of driving electrodes, a plurality of sensing electrodes, and a plurality of dummy electrodes, and the plurality of driving electrodes, the plurality of sensing electrodes, and the plurality of dummy electrodes are formed in a mesh structure including mesh lines extending into spaces between all the plurality of emission areas and outer sides thereof.

In an embodiment, an area of the touch electrodes formed in the position code pattern forming regions is greater than an area of the position code patterns formed to overlap the front surface thereof.

In an embodiment, a formation width in at least one direction of the position code patterns formed in the position code pattern forming regions is the same as a mesh line width of the plurality of touch electrodes formed in peripheral regions where the position code patterns are not formed.

In an embodiment, a formation width in at least one direction of the position code patterns formed in the position code pattern forming regions is smaller than a mesh line width of the touch electrodes formed in the position code pattern forming regions, and is greater than a mesh line width of the plurality of touch electrodes formed in peripheral regions where the position code patterns are not formed.

In an embodiment, a width in at least one of X-axis and Y-axis directions and first through fourth directions of the touch electrodes formed in the position code pattern forming regions is greater than widths in the X-axis and Y-axis directions and the first through fourth directions of the position code patterns formed on the front surface thereof, the X-axis and Y-axis directions are horizontal directions perpendicular to each other and parallel to the extending plane of the display panel, and the first through fourth directions are diagonal directions with respect to the X-axis and Y-axis directions.

A display device according to embodiments and a position input system including the same may generate position coordinate data of a position input device such as an electronic pen with increased efficiency by using position code patterns of a display panel. For example, as a position input may be determined based on accurate input coordinates from the position code patterns, costs and power consumption may be reduced, and a driving process may be simplified.

In addition, display quality may be increased by reducing visibility of the position code patterns. For example, some embodiments include touch electrodes with increased width within the formation regions of the position code patterns.

The effects of the present disclosure are not limited to the aforementioned effects, and various other effects are included in the present disclosure as will be appreciated by one of ordinary skill in the art.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present inventive concept will now be described more fully hereinafter with reference to the accompanying drawings, in which embodiments of the inventive concept are shown. The disclosure may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and various methods for interlocking and driving the therein are possible. Each embodiment may be implemented independently of each other or may be implemented together in an association.

Hereinafter, illustrative embodiments will be described in detail with reference to the accompanying drawings.

Figure 1:
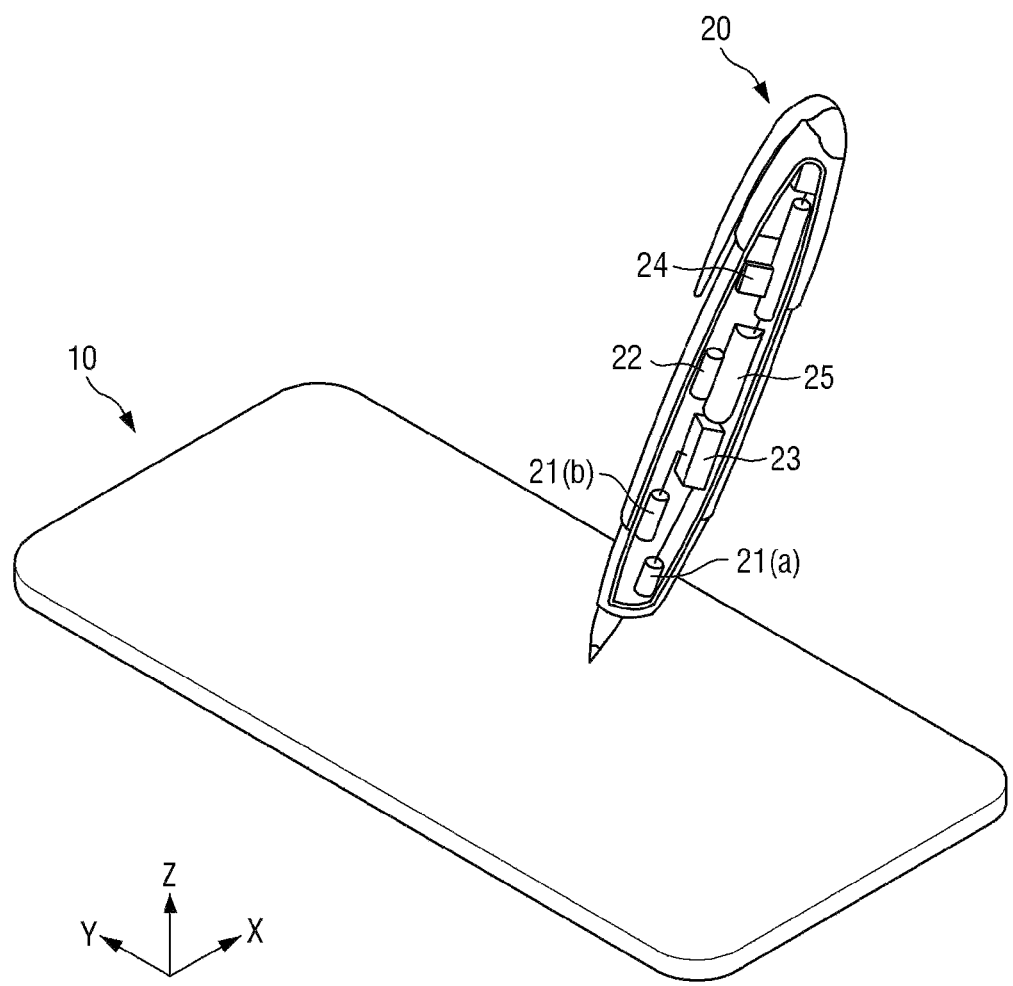
FIG. 1 illustrates a position input system according to an embodiment of the present disclosure.
Figure 2:
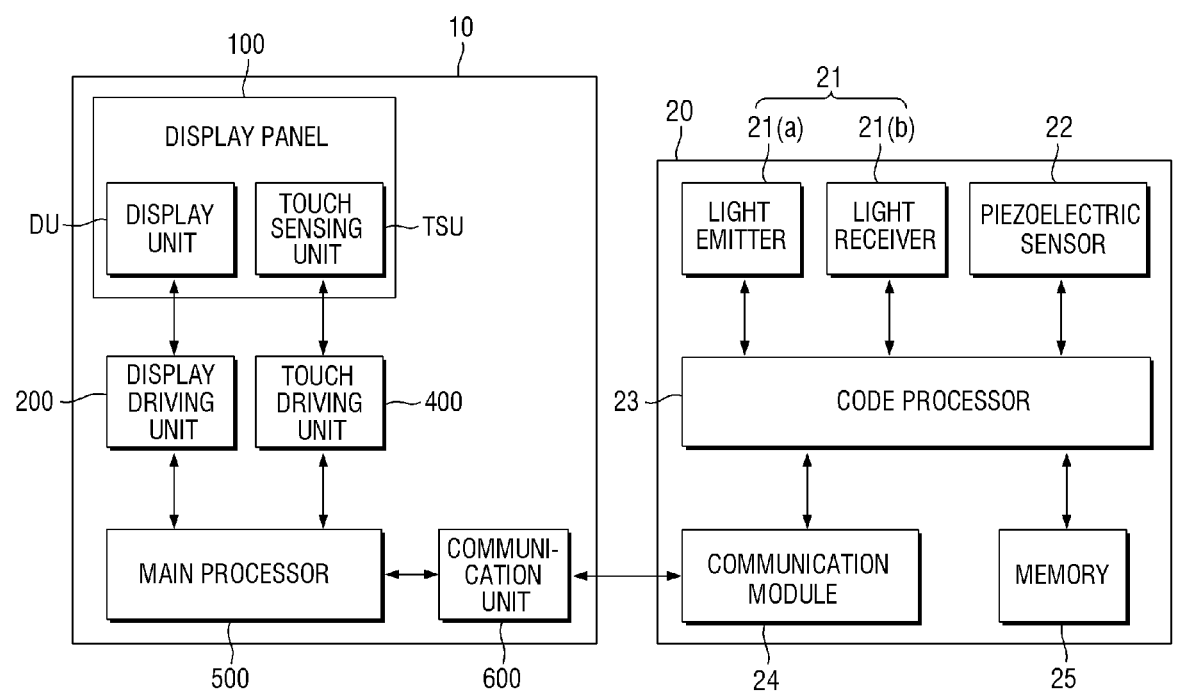
FIG. 2 is a block diagram of a display device and a position input device shown in FIG. 1.

FIG. 1 is a configuration diagram that illustrates a position input system according to an embodiment of the present disclosure. FIG. 2 is a configuration block diagram of a display device and a position input device shown in FIG. 1.

Referring to FIGS. 1 and 2, the display device 10 may be a portable electronic device such as a mobile phone, a smartphone, a tablet personal computer, a mobile communication terminal, an electronic organizer, an electronic book, a portable multimedia player (PMP), a navigation system, an ultra-mobile PC (UMPC) or the like. In some embodiments, the display device 10 may be a display unit of a television, a laptop, a monitor, a billboard, or an Internet-of-Things (IoT) device. For another example, the display device 10 may be a wearable device such as a smart watch, a watch phone, a glasses type display, or a head mounted display (HMD).

The display device 10 may be a light emitting display device such as an organic light emitting display device with an organic light emitting diode, a quantum dot light emitting display device including a quantum dot light emitting layer, an inorganic light emitting display device including an inorganic semiconductor, and/or a micro or nano light emitting display device using a micro or nano light emitting diode (LED). The following describes a case where the display device 10 is an organic light emitting display device, but the present disclosure is not limited thereto.

The display device 10 includes a display panel 100, a display driving unit 200, a touch driving unit 400, a main processor 500, and a communication unit 600.

The display device 10 uses a position input device 20, such as an electronic pen, as a position coordinate input means. The display panel 100 of the display device 10 may include a display unit DU which displays an image, and a touch sensing unit TSU which senses a touch. The touch may originate from, for example, a touch pen or a human body part such as a finger.

The display unit DU of the display panel 100 may include a plurality of unit pixels and may display an image through the plurality of unit pixels. The touch sensing unit TSU may be mounted and attached to the front surface of the display panel 100. The touch sensing unit TSU may include a plurality of touch electrodes, and may sense a touch of a user's body part and a touch pen on the front surface of the display panel 100 in a capacitive manner. For example, the plurality of touch electrodes may form mutual capacitance or self-capacitance to sense a touch of an object or a person. In some embodiments, position code patterns are formed on some of the plurality of touch electrodes, so that the position code patterns are sensed by the position input device 20.

The position code patterns of the display panel 100 include a light blocking member that is formed into a preset planar code shape. The position code patterns may include shapes that cover some of the plurality of touch electrodes by a predetermined area. Accordingly, the position code patterns are detected by the position input device 20 based on the shape, size, area, and/or other physical characteristics of a planar code pattern of the light blocking member.

The position code patterns formed of the light blocking member absorb or block external light incident on the front surface. However, the remaining touch electrodes that are not covered by the position code patterns may reflect the external light incident on the front surface back towards a user. Accordingly, the position code patterns may be visible to the user's eyes as a difference between the brightness on the portion of the front surface covered by the position code patterns and the brightness on the portion of the front surface not covered by the position code patterns increases. In some cases, this makes the position code patterns apparent to the user and reduces display quality.

Some embodiments reduce the visibility of the code patterns by reducing the difference between the brightness of a region where the position code patterns are formed and the brightness of the front surfaces of the touch electrodes where the position code patterns are not formed. For example, in some embodiments, the pattern width and area of the touch electrodes formed in a region where the position code patterns are patterned may be greater than those of the position code patterns. Accordingly, the touch electrodes formed with a width greater than that of the position code patterns may reflect the external light even in the region where the position code patterns are formed. As described above, as the touch electrodes reflect the external light even in the region where the position code patterns are formed, the difference between the brightness of the region where the position code patterns are formed and the brightness of the front surfaces of the touch electrodes where the position code patterns are not formed may be reduced. In this way, embodiments are able to provide touch recognition with decreased computation and corrective measures by way of the position code patterns, while simultaneously preventing visibility of the position code patterns.

The display driving unit 200 may output voltages and signals for driving the display unit DU of the display panel 100. The display driving unit 200 may supply data voltages to data lines. The display driving unit 200 may supply a power voltage to the power line and may supply gate control signals to the gate driving unit.

The touch driving unit 400 may be connected to the touch sensing unit TSU. The touch driving unit 400 may supply a touch driving signal to a plurality of touch electrodes of the touch sensing unit TSU and may sense an amount of change in capacitance between the plurality of touch electrodes. The touch driving unit 400 may determine the presence of a user's touch and determine touch coordinates based on an amount of change in capacitance between the plurality of touch electrodes.

The main processor 500 may control all functions of the display device 10. For example, the main processor 500 may supply digital video data to the display driving unit 200 and the display panel 100 may display an image based on the digital video data. Further, the main processor 500 may receive touch data from the touch driving unit 400 to determine user's touch coordinates, and then may generate digital video data according to the touch coordinates, or execute an application indicated by an icon displayed on the user's touch coordinates.

The main processor 500 may also receive position coordinate data from the position input device 20 and determine the position coordinates of a pointer or arrangement direction of the position input device 20. The main processor 500 may generate digital video data according to the pointer or arrangement position coordinates of the position input device 20, or may execute an application or the like indicated by an icon displayed on the arrangement position coordinates of the position input device 20.

The communication unit 600 may perform wired/wireless communication with an external device. For example, the communication unit 600 may transmit/receive a communication signal to/from a communication module 24 of the position input device 20. The communication unit 600 may receive position coordinate data including data codes from the position input device 20, and may provide the position coordinate data to the main processor 500.

The position input device 20 may be positioned in a front direction of the display panel 100 according to the user's need. The position input device 20 recognizes the position code patterns of the display panel 100 in the front direction of the display panel 100, thereby detecting the pointer or arrangement position coordinates in the front direction of the display panel 100. In an example, the position input device 20 senses light reflected from the position code patterns of the display panel 100 using an optical method. The position input device 20 may detect the position code patterns based on the sensed light, and generate the position coordinate data according to the position code patterns. The position input device 20 may be an electronic pen or stylus such as a smart pen. The pen or stylus may be formed in the shape of a writing instrument, but is not limited thereto.

In an embodiment, the position input device 20 includes a code detector 21, a piezoelectric sensor 22, a code processor 23, a communication module 24, and a memory 25.

In embodiments, the code detector 21 is disposed adjacent to a pen tip of the position input device 20 to detect the position code patterns included in the display panel 100 of the display device 10. The code detector 21 includes a light emitter 21(a) for emitting infrared light using at least one infrared light source, and a light receiver 21(b) for detecting infrared light reflected from the position code patterns with an infrared camera.

In an embodiment, one or more infrared light sources included in the light emitter 21(a) may be configured as an infrared LED array having a matrix structure. The infrared camera of the light receiver 21(b) may include a filter that allows infrared light to pass therethrough while blocking wavelength bands other than the infrared light, a lens system for focusing the infrared light that has passed through the filter, and an optical image sensor that converts an optical image formed by the lens system into an electrical image signal. The light receiver (b) may output the electrical image signal to the code processor 23. The optical image sensor may be composed of an array in a matrix structure similarly to the infrared LED array, and may provide shape data of the position code patterns to the code processor 23 according to the type of infrared light reflected from the position code patterns of the display unit DU. In this way, the code detector 21 of the position input device 20 may continuously detect the position code patterns included in the display unit DU according to the user's control and movement, and continuously generate the shape data of the position code patterns to provide it to the code processor 23.

The code processor 23 may continuously receive the shape data of the position code patterns from the code detector 21. For example, the code processor 23 may continuously receive the shape data of the position code patterns, and may identify the arrangement structure and shape of the position code patterns. The code processor 23 may extract or generate data codes corresponding to the arrangement structure and shape of the position code patterns and may combine the data codes to extract or generate the position coordinate data corresponding to the combined data codes. The code processor 23 may transmit the generated position coordinate data to the display device 10 through the communication module 24. For example, the code processor 23 may receive the shape data of the position code patterns and may generate and convert the data codes respectively corresponding to the position code patterns, thereby rapidly generating the coordinate data without complex computation and correction.

The communication module 24 may perform wired/wireless communication with an external device. For example, the communication module 24 may transmit/receive a communication signal to/from the communication unit 600 of the display device 10. The communication module 24 may receive position coordinate data composed of data codes from the code processor 23, and may provide the position coordinate data to the communication unit 600.

The memory 25 may store data used for driving the position input device 20. The memory 25 stores the shape data of the position code patterns, and the data codes respectively corresponding to the shape data and the position code patterns. In addition, the memory 25 stores the data codes and the position coordinate data according to the combination of the data codes. The memory 25 shares with the code processor 23 the data codes respectively corresponding to the shape data and the position code patterns, and the position coordinate data according to the combination of the data codes. Accordingly, the code processor 23 may combine the data codes through the position coordinate data and the data codes stored in the memory 25, and may extract or generate the position coordinate data corresponding to the combined data codes.

Figure 3:
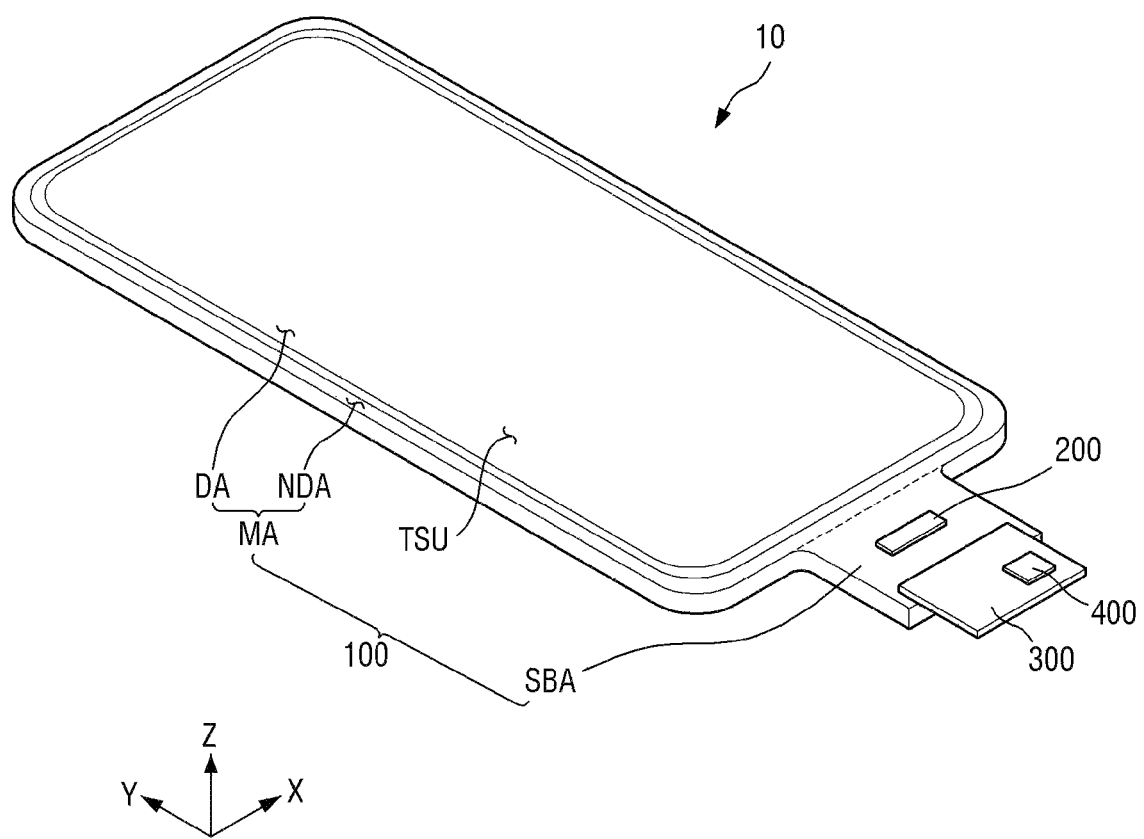
FIG. 3 is a perspective view of a configuration of the display device shown in FIG. 1.
Figure 4:
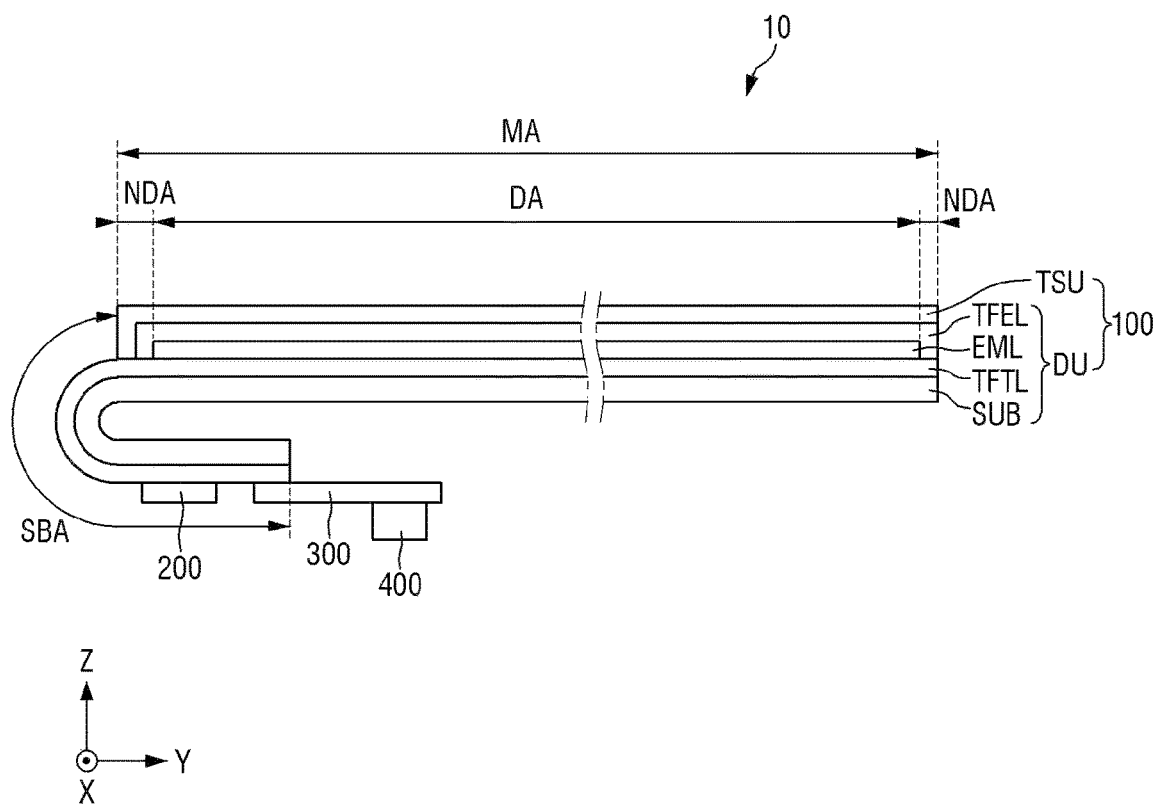
FIG. 4 is a cross-sectional view of a configuration of the display device shown in FIGS. 1 and 3.

FIG. 3 is a perspective view of a configuration of the display device shown in FIG. 1. FIG. 4 is a cross-sectional view of a configuration of the display device shown in FIGS. 1 and 3.

Referring to FIGS. 3 and 4, the display device 10 may have a planar shape similar to a quadrangle. For example, the display device 10 may have a shape similar to a quadrilateral shape in plan view, with short sides which extend an X-axis direction and long sides which extend in a Y-axis direction. The corner where the short side in the X-axis direction and the long side in the Y-axis direction meet may be rounded to have a predetermined curvature or may be right-angled. The planar shape of the display device 10 is not limited to a quadrilateral shape, and may be formed in a shape similar to another polygonal shape, a circular shape, or elliptical shape. The display panel 100 may be flat, but is not limited thereto. For example, the display panel 100 may include a curved portion formed at left and right ends with a predetermined curvature or a varying curvature. The display panel 100 may be flexibly formed to be bent, folded, or rolled.

The display panel 100 may include a main region MA and a sub-region SBA. The main region MA includes a display area DA configured to display an image and a non-display area NDA. The non-display area may be a peripheral area that surrounds lateral sides of the display area DA. The display area DA may emit light from a plurality of unit pixels and a plurality of opening areas (or emission areas) respectively corresponding to the unit pixels. The display panel 100 may include a pixel circuit including switching elements, a pixel defining layer defining an emission area or an opening area, a self-light emitting element, and the like. The non-display area NDA may be an area that surrounds the display area DA in a plan view. The non-display area NDA may be defined as an edge area of the main region MA of the display panel 100. The non-display area NDA may include a gate driving unit that supplies gate signals to the gate lines, and fan-out lines that connect the display driving unit 200 to the display area DA.

The plurality of unit pixels is arranged in first and second directions (X-axis and Y-axis directions) in the display area DA of the display panel 100, and each unit pixel includes a plurality of sub-pixels. The plurality of unit pixels display an image using the plurality of sub-pixels. The plurality of sub-pixels may be arranged in a PENTILE™ matrix structure. In some embodiments, the plurality of sub-pixels may be arranged in a vertical or horizontal stripe structure. The display area DA in which the plurality of unit pixels is arranged may occupy most of the main region MA.

The non-display area NDA may be an area that surrounds the display area DA in a plan view. The non-display area NDA may be defined as an edge area of the main region MA of the display panel 100. The non-display area NDA may include a gate driving unit that supplies gate signals to the gate lines, and fan-out lines that connect the display driving unit 200 to the display area DA.

The sub-region SBA may extend from one side of the main region MA. The sub-region SBA may include a flexible material that can be bent, folded, and rolled. For example, when the sub-region SBA is bent, the sub-region SBA may overlap the main region MA in a thickness direction (Z-axis direction). For example, the sub-region SBA area may be folded underneath the main region MA. The sub-region SBA may include the display driving unit 200 and the pad unit connected to the circuit board 300. The pad unit includes a plurality of pads that electrically connect the circuit board to the display panel 100, and will be described in further detail with reference to FIG. 5. In some embodiments, the sub-region SBA may be omitted, and the display driving unit 200 and the pad unit may be arranged in the non-display area NDA.

The display driving unit 200 may be formed as an integrated circuit (IC) and mounted on the display panel 100 by a chip on glass (COG) method, a chip on plastic (COP) method, or an ultrasonic bonding method. For example, the display driving unit 200 may be disposed in the sub-region SBA, and may overlap the main region MA in the thickness direction (Z-axis direction) by bending of the sub-region SBA. For another example, the display driving unit 200 may be mounted on the circuit board 300.

The circuit board 300 may be attached to the pad unit of the display panel 100 by an anisotropic conductive film (ACF). Lead lines of the circuit board 300 may be electrically connected to a pad unit of the display panel 100. The circuit board 300 may be a flexible printed circuit board, a printed circuit board, or a flexible film such as a chip on film.

A touch driving unit 400 may be mounted on the circuit board 300. The touch driving unit 400 may be an integrated circuit (IC). As described above, the touch driving unit 400 may supply a touch driving signal to a plurality of touch electrodes of the touch sensing unit TSU and may sense an amount of change in capacitance between the plurality of touch electrodes. The touch driving signal may be a pulse signal having a predetermined frequency. The touch driving unit 400 determines whether a touch of a user's body part such as a finger is inputted and calculates touch coordinates, based on the amount of change in capacitance between the plurality of touch electrodes.

Referring to FIG. 4, the display panel 100 may include a display unit DU, a touch sensing unit TSU, and a polarizing film in cross-sectional view. The display unit DU may include the substrate SUB, the thin film transistor layer TFTL, the light emitting element layer EML, and the encapsulation layer TFEL.

The substrate SUB may be a base substrate or a base member. The substrate SUB may be a flexible substrate that can be bent, folded, and rolled. For example, the substrate SUB may include a glass material or a metal material, but is not limited thereto. In some embodiments, the substrate SUB may include a polymer resin such as polyimide (PI).

The thin film transistor layer TFTL may be disposed on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines that connect the display driving unit 200 to the data lines, and lead lines that connect the display driving unit 200 to the pad unit. When the gate driving unit is formed on one side of the non-display area NDA of the display panel 100, the gate driving unit may also include thin film transistors.

The thin film transistor layer TFTL may be disposed in the display area DA, the non-display area NDA, and the sub-region SBA. Thin film transistors, gate lines, data lines, and power lines of each of the pixels of the thin film transistor layer TFTL may be disposed in the display area DA. Gate control lines and fan-out lines of the thin film transistor layer TFTL may be disposed in the non-display area NDA. The lead lines of the thin film transistor layer TFTL may be disposed in the sub-region SBA.

The light emitting element layer EML may be disposed on the thin film transistor layer TFTL. The light emitting element layer EML may include a plurality of light emitting elements in which a first electrode, a light emitting layer, and a second electrode are sequentially stacked. The first electrode, light emitting layer, and second electrode are configured to emit light. The light emitting element layer EML may further include a pixel defining layer that defines pixels. The plurality of light emitting elements of the light emitting element layer EML may be disposed in the display area DA. The light emitting layer may be an organic light emitting layer containing an organic material. The light emitting layer may include a hole transporting layer, an organic light emitting layer, and an electron transporting layer. When the first electrode receives a predetermined voltage through the thin film transistor of the thin film transistor layer TFTL and the second electrode receives the cathode voltage, holes and electrons may be transferred to the organic light emitting layer through the hole transporting layer and the electron transporting layer, respectively, and may be combined with each other to emit light in the organic light emitting layer. For example, the first electrode may be an anode electrode, and the second electrode may be a cathode electrode, but the present disclosure is not limited thereto.

In some embodiments, the plurality of light emitting elements may include a quantum dot light emitting diode including a quantum dot light emitting layer or an inorganic light emitting diode including an inorganic semiconductor.

The encapsulation layer TFEL may cover the top surface and the side surface of the light emitting element layer EML, and may protect the light emitting element layer EML. The encapsulation layer TFEL may include at least one inorganic layer and at least one organic layer for encapsulating the light emitting element layer EML.

The touch sensing unit TSU may be disposed on the encapsulation layer TFEL. The touch sensing unit TSU may include a plurality of touch electrodes for sensing a user's touch in a capacitive manner, and touch lines connecting the plurality of touch electrodes to the touch driving unit 400. For example, the touch sensing unit TSU may sense a user's touch by a self-capacitance method or a mutual capacitance method.

In some embodiments the touch sensing unit TSU may be disposed on a separate substrate which is disposed on the display unit DU. In this case, the substrate supporting the touch sensing unit TSU may be a base member that encapsulates the display unit DU.

The plurality of touch electrodes of the touch sensing unit TSU may be disposed in a touch sensor area overlapping the display area DA. The touch lines of the touch sensing unit TSU may be disposed in a touch peripheral area that overlaps the non-display area NDA.

The sub-region SBA of the display panel 100 may extend from one side of the main region MA. The sub-region SBA may include a flexible material that can be bent, folded, and rolled. For example, when the sub-region SBA is bent, the sub-region SBA may overlap the main region MA in a thickness direction (Z-axis direction) as shown in FIG. 4. The sub-region SBA may include the display driving unit 200 and the pad unit connected to the circuit board 300.

Figure 5:
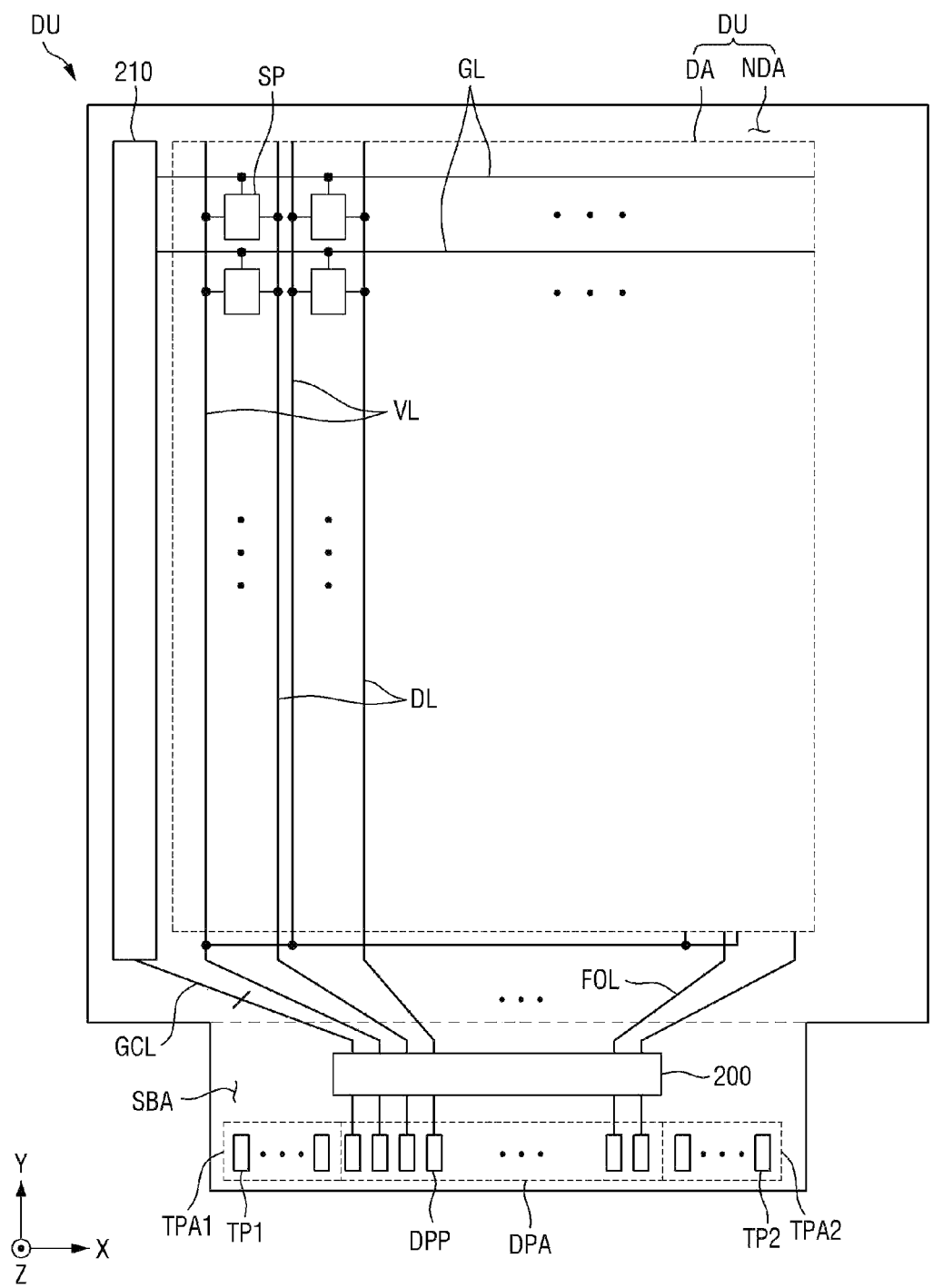
FIG. 5 is a plan view that illustrates a display unit of a display device according to one embodiment.

FIG. 5 is a plan view that illustrates a display unit of a display device according to one embodiment.

Referring to FIG. 5, the display area DA of the display unit DU is an area in which an image is displayed, and may be defined as a central region of the display panel 100. The display area DA may include a plurality of sub-pixels SP, a plurality of gate lines GL, a plurality of data lines DL, and a plurality of power lines VL. Each of the plurality of sub-pixels SP may be defined as the smallest unit that outputs light.

The plurality of gate lines GL may supply the gate signals received from the gate driving unit 210 to the plurality of sub-pixels SP. The plurality of gate lines GL may extend in the X-axis direction and may be spaced apart from each other in the Y-axis direction that crosses the X-axis direction.

The plurality of data lines DL may supply the data voltages received from the display driving unit 200 to the plurality of sub-pixels SP. The plurality of data lines DL may extend in the Y-axis direction and may be spaced apart from each other in the X-axis direction.

The plurality of power lines VL may supply the power voltage received from the display driving unit 200 to the plurality of pixels SP. The power voltage may be at least one of a driving voltage, an initialization voltage, or a reference voltage. The plurality of power lines VL may extend in the Y-axis direction and may be spaced apart from each other in the X-axis direction.

The non-display area NDA of the display unit DU may surround the display area DA. The non-display area NDA may include a gate driving unit 210, fan-out lines FOL, and gate control lines GCL. The gate driving unit 210 may generate a plurality of gate signals based on the gate control signal, and may sequentially supply the plurality of gate signals to the plurality of gate lines GL according to a set order.

The fan-out lines FOL may extend from the display driving unit 200 to the display area DA. The fan-out lines FOL may supply the data voltage received from the display driving unit 200 to the plurality of data lines DL.

The gate control line GCL may extend from the display driving unit 200 to the gate driving unit 210. The gate control line GCL may supply the gate control signal received from the display driving unit 200 to the gate driving unit 210.

The sub-region SBA may include the display driving unit 200, a display pad area DPA, and first and second touch pad areas TPA1 and TPA2.

The display driving unit 200 may output signals and voltages for driving the display panel 100 through the fan-out lines FOL. The display driving unit 200 may supply a data voltage to the data line DL through the fan-out lines FOL. The data voltage may be supplied to the plurality of sub-pixels SP to determine the luminance of the plurality of sub-pixels SP. The display driving unit 200 may supply the gate control signal to the gate driving unit 210 through the gate control line GCL.

The display pad area DPA, the first touch pad area TPA1, and the second touch pad area TPA2 may be disposed at an edge of the sub-region SBA. The display pad area DPA, the first touch pad area TPA1, and the second touch pad area TPA2 may be electrically connected to the circuit board 300 by using an anisotropic conductive film or a low-resistance high-reliability material such as SAP.

The display pad area DPA may include a plurality of display pad units DPP. The plurality of display pad units DPP may be connected to the main processor 500 through the circuit board 300. The plurality of display pad units DPP may be connected to the circuit board 300 and receive digital video data, and may supply the digital video data to the display driving unit 200.

Figure 6:
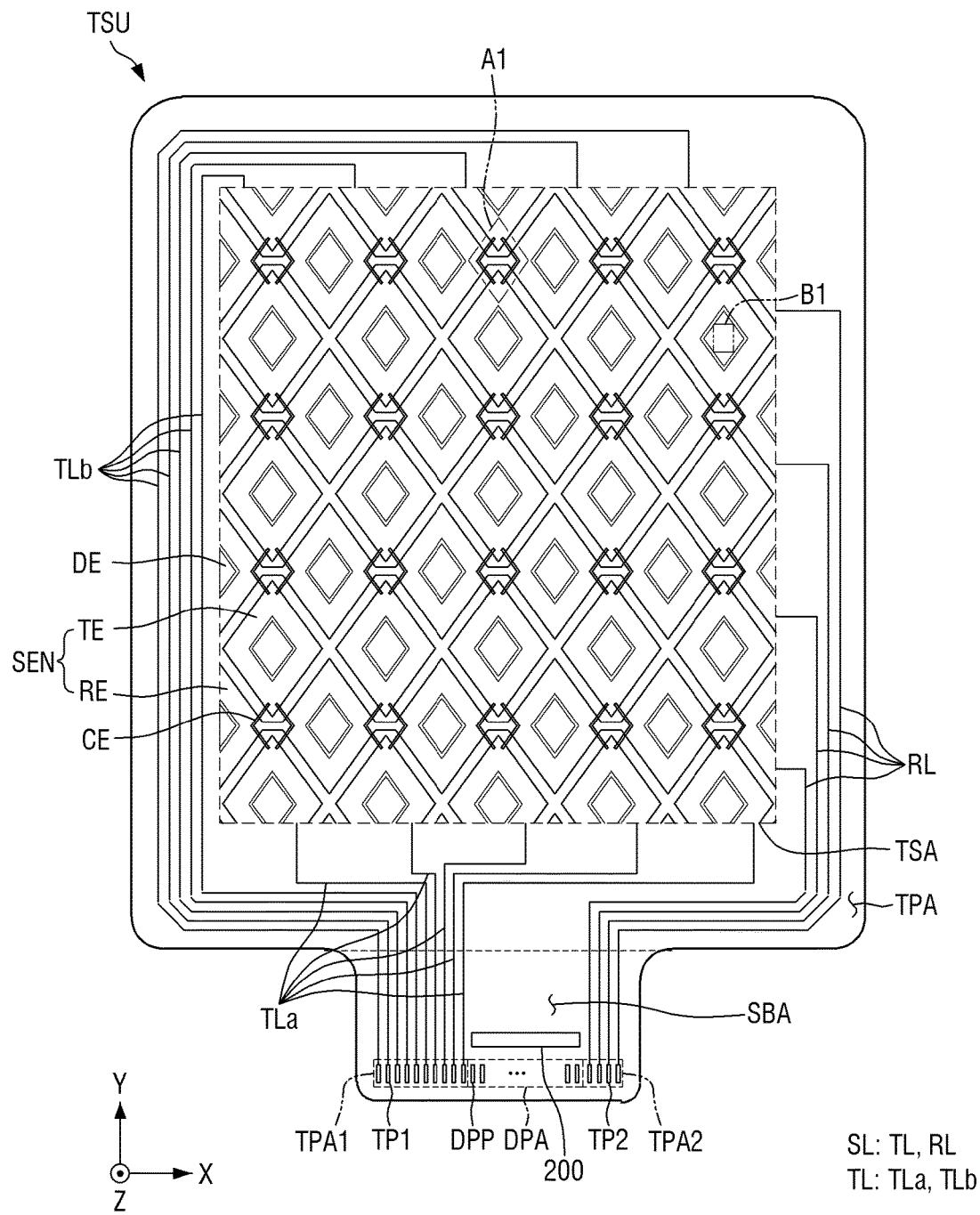
FIG. 6 is a plan view that illustrates a touch sensing unit of a display device according to one embodiment.

FIG. 6 is a plan view that illustrates a touch sensing unit of a display device according to one embodiment.

Referring to FIG. 6, the touch sensing unit TSU may include a touch sensor area TSA for sensing a user's touch, and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DE. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. Driving electrodes TE that are adjacent to each other in the Y-axis direction may be electrically connected to each other through a plurality of connection electrodes CE.

The plurality of driving electrodes TE may be connected to a first touch pad unit TP1 through a driving line TL. The driving line TL may include a lower driving line TLa and an upper driving line TLb. For example, some of the driving electrodes TE disposed under the touch sensor area TSA may be connected to the first touch pad unit TP1 through the lower driving line TLa, and other driving electrodes TE disposed on the upper side of the touch sensor area TSA may be connected to the first touch pad unit TP1 through the upper driving line TLb. The lower driving line TLa may extend to the first touch pad unit TP1 through the lower side of the touch peripheral area TPA. The upper driving line TLb may extend to the first touch pad unit TP1 through the upper side, the left side, and the lower side of the touch peripheral area TPA. The lower driving line TLa may include a plurality of lower driving lines, and the upper driving line TLb may include a plurality of upper driving lines. The first touch pad unit TP1 may be connected to the touch driving unit 400 through the circuit board 300.

The connection electrode CE may have a shape that includes at least one bend. For example, the connection electrode CE may have an angle bracket shape ("<" or ">"), but the planar shape of the connection electrode CE is not limited thereto. The driving electrodes TE adjacent to each other in the Y-axis direction may be electrically connected by a plurality of connection electrodes CE, and if any one of the connection electrodes CE is disconnected, the adjacent driving electrodes TE may be stably connected through the remaining connection electrode CE. The driving electrodes TE adjacent to each other may be connected by two connection electrodes CE, but the number of connection electrodes CE is not limited thereto.

The connection electrode CE may be disposed on a different layer from the plurality of driving electrodes TE and the plurality of sensing electrodes RE. Sensing electrodes RE that are adjacent to each other in the X-axis direction may be electrically connected to each other through a connection portion disposed on the same layer as the plurality of driving electrodes TE or the plurality of sensing electrodes RE. For example, the plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent in the X-axis direction may be electrically connected through a connection portion.

The driving electrodes TE adjacent in the Y-axis direction may be electrically connected to each other through the connection electrodes CE disposed on a layer different from that of the plurality of driving electrodes TE or the plurality of sensing electrodes RE. In an embodiment, the connection electrodes CE may be formed on a rear layer (or lower layer) with respect to the layer on which the driving electrodes TE and the sensing electrodes RE are formed. The connection electrodes CE are electrically connected to adjacent driving electrodes TE through a plurality of contact holes. Accordingly, although the connection electrodes CE overlap the plurality of sensing electrodes RE in the Z-axis direction, the plurality of driving electrodes TE and the plurality of sensing electrodes RE may be insulated from each other. Mutual capacitance may be formed between the driving electrode TE and the sensing electrode RE.

The plurality of sensing electrodes RE may be connected to the second touch pad unit TP2 through a sensing line RL. For example, some of the sensing electrodes RE disposed on the right side of the touch sensor area TSA may be connected to the second touch pad unit TP2 through the sensing line RL. The sensing line RL may extend to the second touch pad unit TP2 through the right side and the lower side of the touch peripheral area TPA. The sensing line RL may include a plurality of sensing lines. The second touch pad unit TP2 may be connected to the touch driving unit 400 through the circuit board 300.

Each of the plurality of dummy electrodes DE may be surrounded by the driving electrode TE or the sensing electrode RE. Each of the dummy electrodes DE may be insulated from the driving electrodes TE and the sensing electrodes RE by being spaced apart from the driving electrode TE or the sensing electrode RE. Accordingly, the dummy electrode DE may be electrically floating.

The position code patterns of a planar code shape are formed at preset intervals on a part of the front surface of at least one of the plurality of driving electrodes TE, the plurality of sensing electrodes RE, or the plurality of dummy electrodes DE.

The display pad area DPA, the first touch pad area TPA1, and the second touch pad area TPA2 may be disposed at an edge of the sub-region SBA. For example, when the sub-region SBA is viewed extended (i.e., not folded under the display panel) and in a plan view, the display pad area DPA, the first touch pad area TPA1, and the second touch pad area TPA2 may be disposed at a bottom edge of the sub-region SBA. The display pad area DPA, the first touch pad area TPA1, and the second touch pad area TPA2 may be electrically connected to the circuit board 300 by using an anisotropic conductive film or a low-resistance high-reliability material such as SAP.

The first touch pad area TPA1 may be disposed on one side of the display pad area DPA, and may include a plurality of first touch pad units TP1. The plurality of first touch pad units TP1 may be electrically connected to the touch driving unit 400 disposed on the circuit board 300. The plurality of first touch pad units TP1 may supply a touch driving signal to the plurality of driving electrodes TE through a plurality of driving lines TL.

The second touch pad area TPA2 may be disposed on the other side of the display pad area DPA, and may include a plurality of second touch pad units TP2. The plurality of second touch pad units TP2 may be electrically connected to the touch driving unit 400 disposed on the circuit board 300. The touch driving unit 400 may receive a touch sensing signal through a plurality of sensing lines RL connected to the plurality of second touch pad units TP2, and may sense a change in mutual capacitance between the driving electrode TE and the sensing electrode RE.

In an embodiment, the touch driving unit 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driving unit 400 may sense an amount of change in electric charge of each of the plurality of driving electrodes TE and the plurality of sensing electrodes RE based on the touch sensing signal.

Figure 7:
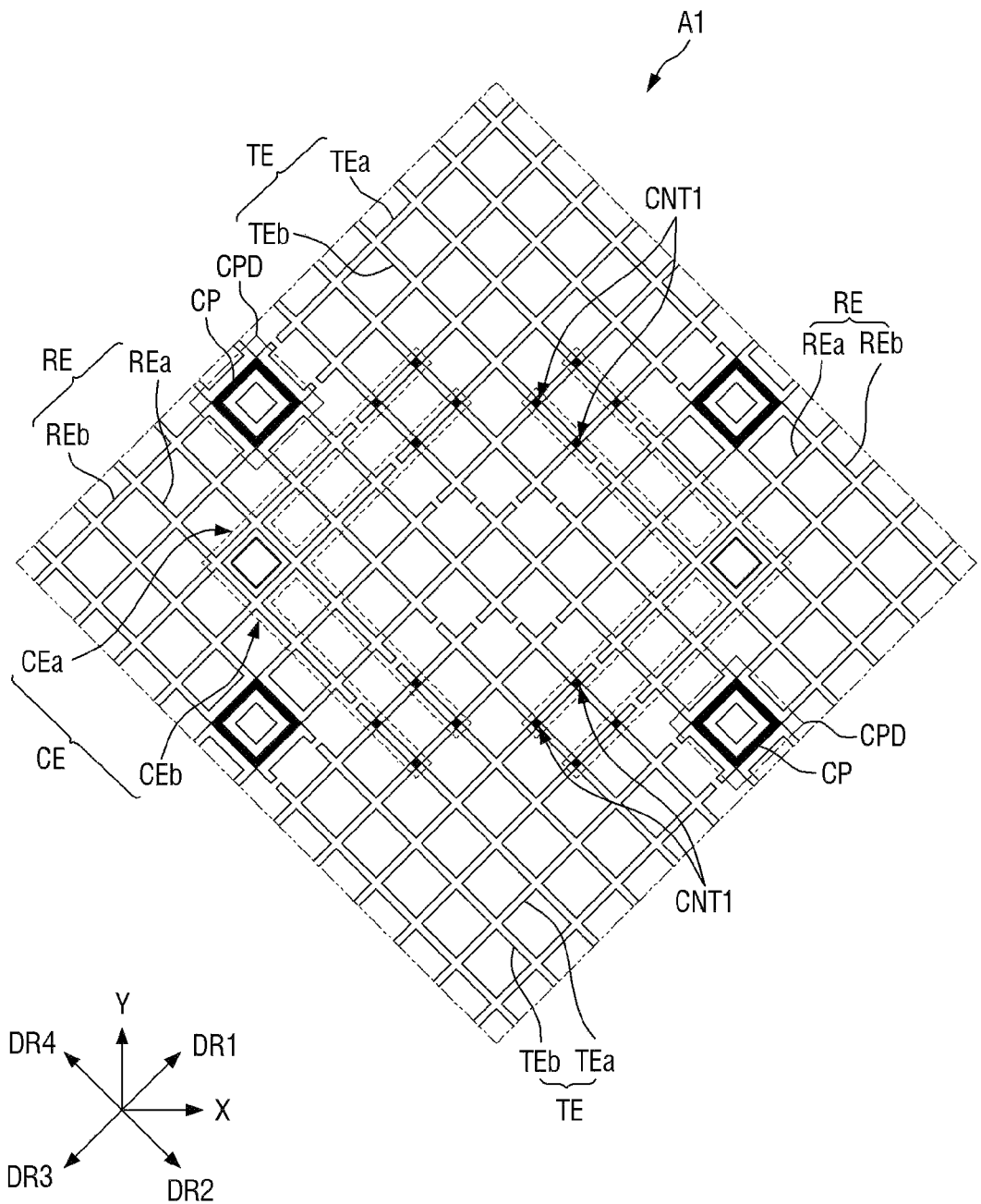
FIG. 7 is an enlarged view of pattern shapes of position code patterns and touch electrodes formed in area A1 of FIG. 6.
Figure 8:
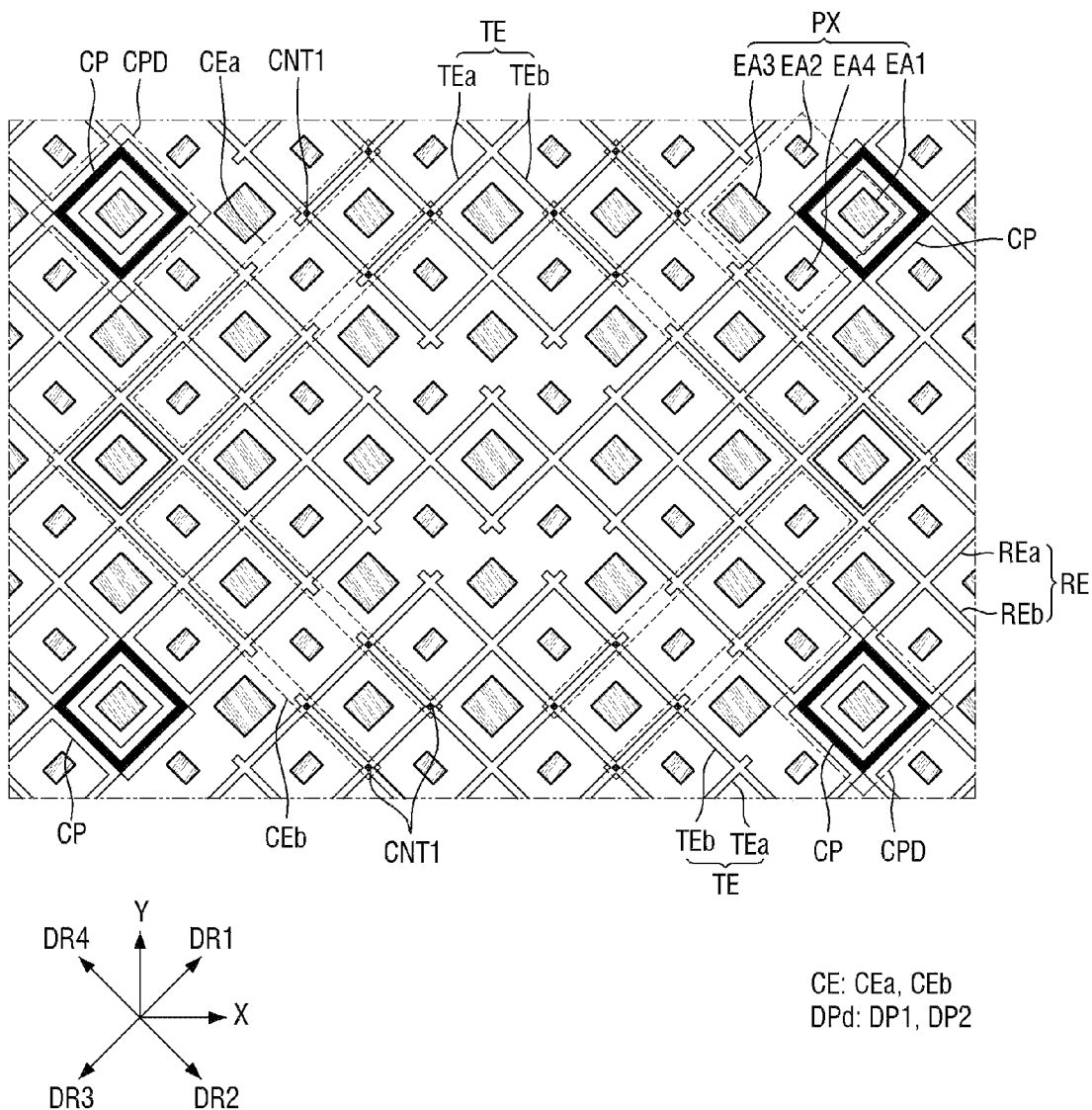
FIG. 8 is an enlarged view of area A1 in which touch electrodes and position code patterns are arranged according to a first embodiment.

FIG. 7 is an enlarged view of pattern shapes of position code patterns and touch electrodes formed in area A1 of FIG. 6. FIG. 8 is an enlarged view of area A1 in which touch electrodes and position code patterns are arranged according to a first embodiment.

Referring to FIGS. 7 and 8, the plurality of driving electrodes TE, the plurality of sensing electrodes RE, and the plurality of dummy electrodes DE may be disposed on the same layer and may be spaced apart from each other. Accordingly, the plurality of driving electrodes TE, the plurality of sensing electrodes RE, and the plurality of dummy electrodes DE may be electrically insulated from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent in the Y-axis direction may be electrically connected through the connection electrode CE. In FIGS. 7 and 8, the connection electrode CE is represented with a dotted line, as it is disposed on a different layer than the layer in which the plurality of driving electrodes TE, the plurality of sensing electrodes RE, and the plurality of dummy electrodes DE are disposed.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent in the X-axis direction may be electrically connected. For example, the sensing electrodes RE may be electrically connected through the connection portion, and the connection portion may be disposed within the shortest distance between the driving electrodes TE adjacent to each other. In the example shown in FIG. 7, the connection portion comprises the unbroken lattice pattern between adjacent sensing electrodes RE.

The plurality of connection electrodes CE may be disposed on a layer different from the driving electrode TE and the sensing electrode RE, e.g., on a rear surface layer. The connection electrode CE may include a first portion CEa and a second portion CEb. For example, the first portion CEa of the connection electrode CE may be connected to the driving electrode TE disposed on one side (e.g., an upper driving electrode in the Y-axis direction) through a first contact hole CNT1 and extend in a third direction DR3. The second portion CEb of the connection electrode CE may be bent from the first portion CEa in an area overlapping the sensing electrode RE to extend in a second direction DR2, and may be connected to the driving electrode TE disposed on the other side (e.g., a lower driving electrode in the Y-axis direction) through the first contact hole CNT1. As used herein, a first direction DR1 may be a direction that is on the same plane as but disposed between the X-axis direction and the Y-axis direction. A second direction DR2 may be a direction that is on the same plane as but disposed between the opposite direction of the Y-axis (e.g., a −Y-axis) and the X-axis direction. A third direction DR3 may be an opposite direction of the first direction DR1. A fourth direction DR4 may be an opposite direction of the second direction DR2. Accordingly, each of the plurality of connection electrodes CE may connect adjacent driving electrodes TE in the Y-axis direction.

As described above, with reference to FIG. 8, each unit pixel PX may include first to third sub-pixels or first to fourth sub-pixels, and each of the first to fourth sub-pixels may include first to fourth emission areas EA1, EA2, EA3, and EA4. For example, the first emission area EA1 may emit light of a first color or red light, the second emission area EA2 may emit light of a second color or green light, and the third emission area EA3 may emit light of a third color or blue light. Further, the fourth emission area EA4 may emit light of a fourth color or light of any one of the first to third colors, but the present disclosure is not limited thereto.

Each unit pixel PX may express a gray level through the first to third emission areas EA1 to EA3 or the first to fourth emission areas EA1, EA2, EA3, and EA4. Further, gray levels of various colors such as white and the like may be expressed by a combination of lights emitted from the first to third emission areas EA1, EA2, and EA3 or the first to fourth emission areas EA1, EA2, EA3, and EA4.

Depending on the arrangement structure of the first to third sub-pixels or the first to fourth sub-pixels, the plurality of driving electrodes TE, the plurality of sensing electrodes RE, and the plurality of dummy electrodes DE may be formed in a mesh structure or a net structure as apparent in plan view. The mesh structure may include mesh lines constituting the various electrodes which extend in the spaces between emission areas.

The plurality of driving electrodes TE, the plurality of sensing electrodes RE, and the plurality of dummy electrodes DE may surround the spaces between the first to third emission areas EA1, EA2, and EA3 or the first to fourth emission areas EA1, EA2, EA3, and EA4 constituting the unit pixel PX and the outer sides thereof in plan view. Accordingly, the plurality of driving electrodes TE, the plurality of sensing electrodes RE, and the plurality of dummy electrodes DE may not overlap first to fourth emission areas EA1, EA2, EA3, and EA4 in plan view. The plurality of connection electrodes CE may also not overlap the first to third emission areas EA1, EA2, EA3, and EA4. For example, in some embodiments, the structures constituting the plurality of connection electrodes CE may follow and directly overlap the mesh/net structure of the electrodes described above, thereby preventing overlap with omission areas in plan view. Accordingly, the display device 10 may prevent the luminance of light emitted from the first to fourth emission areas EA1, EA2, EA3, and EA4 from being reduced by the touch sensing unit TSU.

Each of the plurality of driving electrodes TE may include a first portion TEa extending in the first direction DR1 and a second portion TEb extending in the second direction DR2, thereby preventing overlap with the first to fourth emission areas EA1, EA2, EA3, and EA4 in plan view. In addition, each of the plurality of sensing electrodes RE may include a first portion REa extending in the first direction DR1 and a second portion REb extending in the second direction DR2, thereby preventing overlap with the first to fourth emission areas EA1, EA2, EA3, and EA4. The plurality of dummy electrodes DE are also formed so as not to overlap the first to fourth emission areas EA1, EA2, EA3, and EA4.

Position code patterns CP are formed on a part of the front surface of each of the plurality of dummy electrodes DE, the plurality of driving electrodes TE, and the plurality of sensing electrodes RE corresponding to preset position code pattern forming regions CPD. For example, the position code patterns CP may be formed at preset intervals (e.g., about 300 μm intervals) on a part of the front surfaces of the plurality of dummy electrodes DE, the plurality of driving electrodes TE, and the plurality of sensing electrodes RE. Each of the position code patterns CP is formed in a planar code pattern shape or a planar code shape of a preset size. The position code patterns CP may be formed to block or absorb infrared light applied from the position input device 20 to minimize the reflectance of the infrared light, and due to the planar code shape that minimizes the infrared light reflectance, the position input device 20 may recognize the position code patterns CP.

The planar code shape of the position code patterns CP may be formed in a polygonal pattern shape including a rectangle, a square, a circle, a semicircle, a sector, a rhombus, or may be formed in a pattern shape in which a plurality of polygonal pattern shapes are combined. In the embodiment illustrated in FIG. 8, the planar code shape is roughly a square, but the shape is not limited thereto. In addition, the planar code shape of the position code patterns CP may be formed in a closed loop pattern shape such as a rectangle, a square, a rhombus, a pentagon, or a hexagon while surrounding at least one emission area. In some embodiments, the planar code pattern shape of the position code patterns CP may be formed in an open loop pattern shape and may surround only a part of at least one emission area. In addition, the planar code shape of the position code patterns CP may be formed in a straight or curved pattern shape of a preset length. In some embodiments, when the position code patterns CP do not surround one emission area but surround the spaces between all the plurality of emission areas and the outer sides thereof, the position code patterns CP may have a shape of a mesh pattern structure and a net pattern structure in plan view.

As described above, the position code patterns CP formed of the light blocking member absorb or block external light incident on the front surface. However, the remaining touch electrodes SEN on which the position code patterns CP are not formed may reflect the external light incident on the front surface back to the front surface. Accordingly, to reduce the difference between the external light reflectance of the position code pattern forming regions CPD and the external light reflectance of peripheral regions where the position code patterns CP are not formed, the pattern width of the touch electrodes SEN that overlap or correspond to the position code patterns CP may be formed to be greater than the width or size of the position code patterns CP. For example, a width of the touch electrodes SEN in a horizontal direction (e.g., in any direction parallel to an extending plane of the display device) may be greater than a width of the position code patterns CP in that horizontal direction. Examples of horizontal directions will be described later, and may include an X-axis direction, a Y-axis direction, a first direction DR1, a second direction DR2, a third direction DR3, and a fourth direction DR4. In addition, the area of the touch electrodes SEN formed in the position code pattern forming regions CPD may be greater than the area of the position code patterns CP formed to overlap or correspond to the front surface thereof. In this way, embodiments prevent the position code patterns CP from being apparent to a user.

For example, the width of the touch electrodes SEN formed in the position code pattern forming regions CPD may be greater than the width in at least one direction of the position code patterns CP. As an example, the width or size of the touch electrodes SEN in at least one of the X-axis and Y-axis directions and the first to fourth directions DR1 to DR4 may be formed to be greater than the widths or sizes of the position code patterns CP in the X and Y directions and in the first to fourth directions DR1 to DR4. In this case, the X-axis and Y-axis directions may be vertical and horizontal directions, and the first to fourth directions DR1 to DR4 may be diagonal directions with respect to the X-axis and Y-axis directions.

The planar pattern shape of the touch electrodes SEN respectively formed in the position code pattern forming regions CPD may correspond to the planar code shape of each of the position code patterns CP. For example, the planar pattern shape of the touch electrodes SEN respectively formed in the position code pattern forming regions CPD may the same or similar to the planar code shape of each of the position code patterns CP, and may be formed in a polygonal pattern shape such as a rectangle, a square, a circle, a semicircle, a sector, a rhombus, or a combination thereof. Here, the width of the touch electrodes SEN formed in the position code pattern forming regions CPD may be greater than the width in at least one direction of the position code pattern CP.

Figure 9:
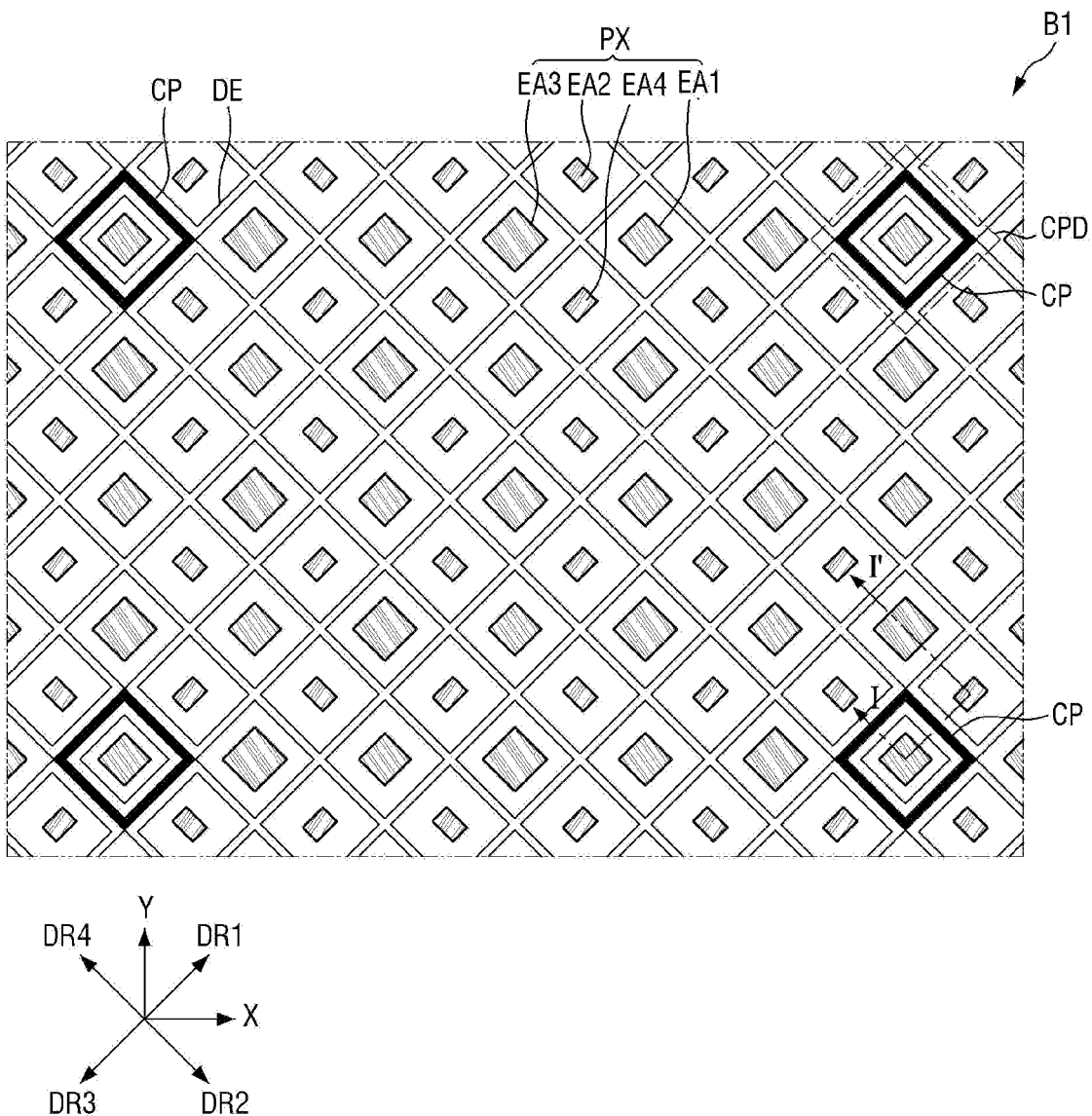
FIG. 9 is an enlarged view of the pattern shapes of touch electrodes and position code patterns in area B1 shown in FIG. 6.

FIG. 9 is an enlarged view of the pattern shapes of touch electrodes and position code patterns in area B1 shown in FIG. 6.

Referring to FIG. 9, in addition to the driving electrodes TE and the sensing electrodes RE, the dummy electrodes DE may be formed in the preset position code pattern forming regions CPD, and the position code patterns CP may also be formed in a part of the front surfaces of the dummy electrodes DE at a preset interval of about 300 μm. The preset interval may refer to a spacing interval in any one or more of the previously enumerated directions.

The width, size, and length of the position code patterns CP in at least one direction may be set and formed to correspond to the size, sensing area, arrangement structure, and the like of the light receiver 21(b) or the optical image sensor included in the code detector 21 of the position input device 20.

The width of the dummy electrodes DE formed in the position code pattern forming regions CPD may also be greater than the width of the position code patterns CP, similar to the driving electrodes TE and the sensing electrodes RE that are formed in the code pattern forming regions CPD. Accordingly, external light may be reflected to the front surface of the dummy electrodes DE protruding in a vertical direction or at least one lateral direction of the position code pattern CP.

The planar pattern shape of the dummy electrodes DE, which corresponds to the planar code shape of the position code patterns CP and has a greater width than that of the position code patterns CP, may be formed in a polygonal pattern shape such as a rectangle, a square, a circle, a semicircle, a sector, or a rhombus, or a combination thereof. As an example, the planar pattern shape of the dummy electrodes DE formed to have a greater width corresponding to the planar code shape of the position code patterns CP may be formed in a rhombus pattern shape surrounding at least one emission area EA1. In this case, the width or size of the dummy electrodes DE, formed to correspond to the position code patterns CP, in at least one of the X-axis and Y-axis directions and the first to fourth directions DR1 to DR4 may be greater than the widths or sizes of the position code patterns CP in the X-axis and Y-axis directions and the first to fourth directions DR1 to DR4. FIG. 9 illustrates an example in which the widths of the dummy electrodes DE in the first to fourth directions DR1 to DR4 are formed to be greater than the widths of the position code pattern CP in the first to fourth directions DR1 to DR4.

As such, the planar pattern shape of the dummy electrodes DE having a greater width corresponding to the planar code shape of the position code patterns CP may be formed in a closed loop pattern shape such as a rectangle, a square, a rhombus, a pentagon, or a hexagon while surrounding at least one emission area EA1.

Figure 10:
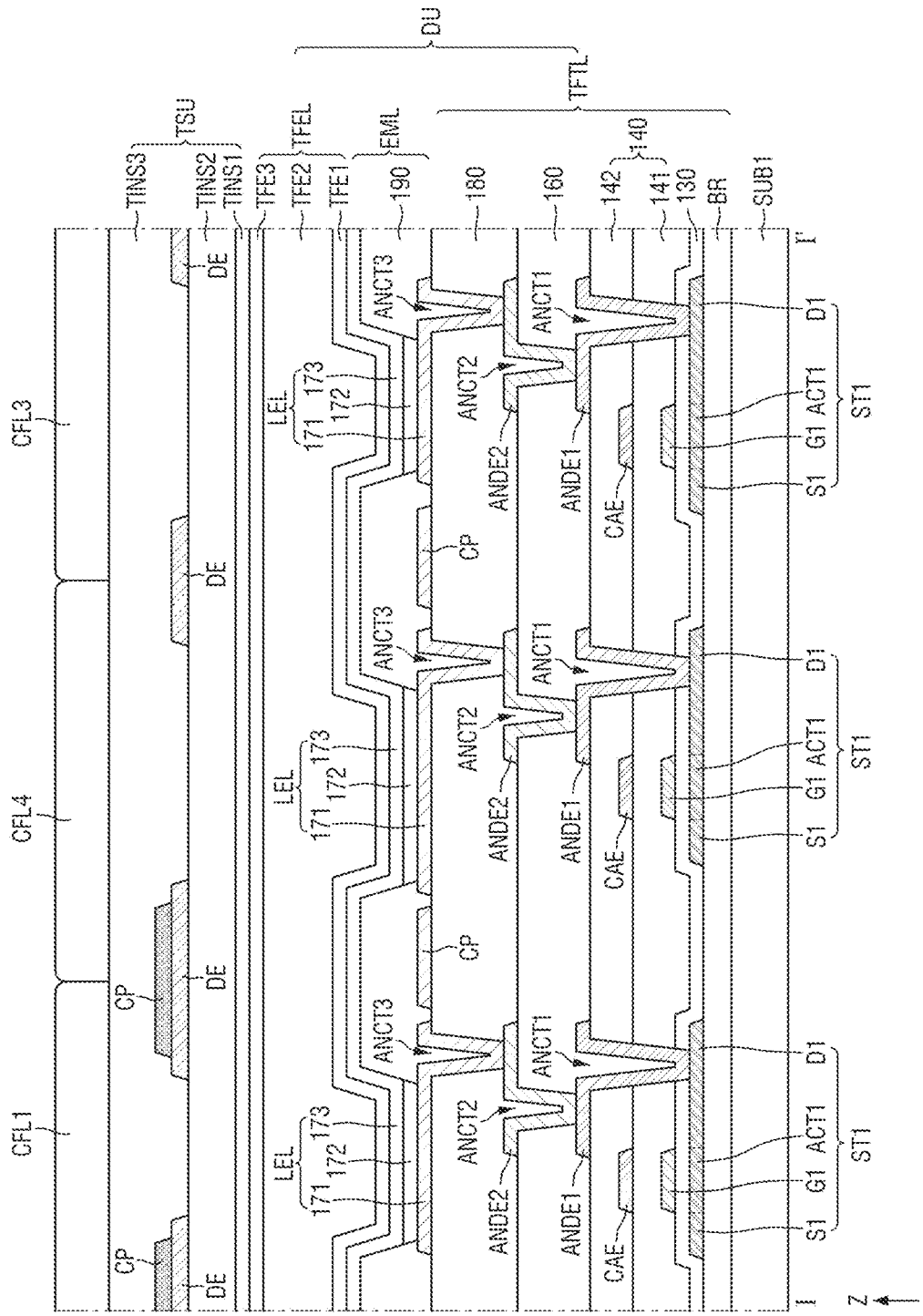
FIG. 10 is a cross-sectional view of a cross-sectional structure taken along line I-I' of FIG. 9 according to one embodiment.
Figure 11:
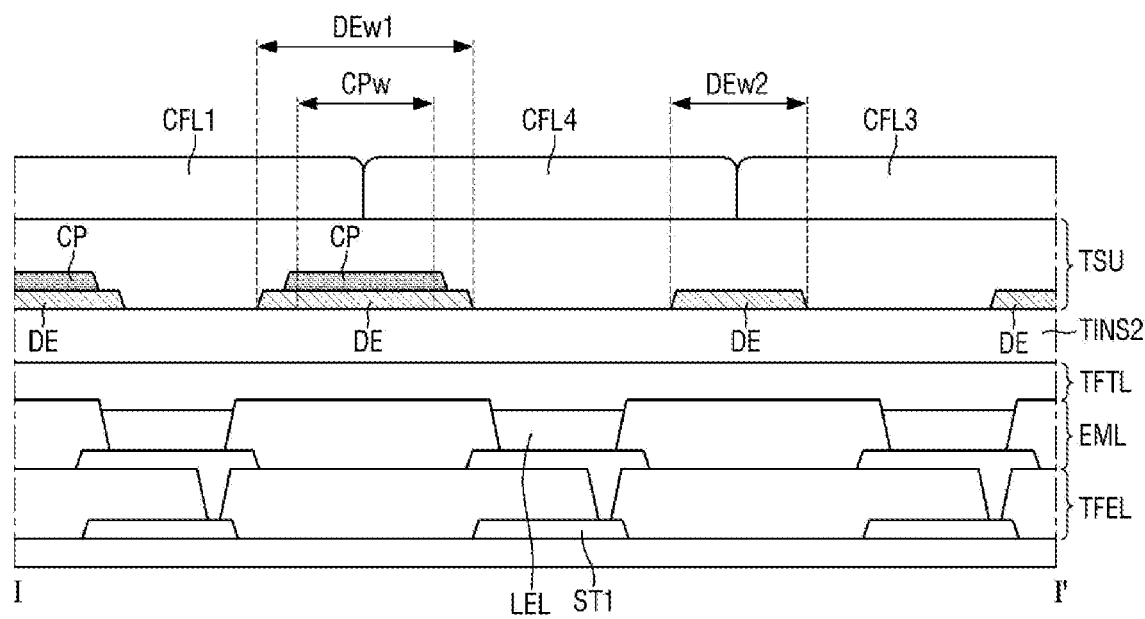
FIG. 11 is a schematic cross-sectional view that illustrates a cross-sectional structure taken along line I-I' of FIG. 10.

FIG. 10 is a cross-sectional view of a cross-sectional structure taken along line I-I' of FIG. 9 according to one embodiment. FIG. 11 is a schematic cross-sectional view that illustrates a cross-sectional structure taken along line I-I' of FIG. 10 in blocks.

Referring to FIGS. 10 and 11, a barrier layer BR may be disposed on the substrate SUB. The substrate SUB may be formed of an insulating material such as polymer resin. For example, the substrate SUB may be formed of polyimide. The substrate SUB may be a flexible substrate which can be bent, folded or rolled (i.e., without damage thereto).

The barrier layer BR protects transistors of the thin film transistor layer TFTL and a light emitting layer 172 of the light emitting element layer EML from moisture permeating through the substrate SUB, which may be susceptible to moisture permeation. The barrier layer BR may be formed as a plurality of inorganic layers that are alternately stacked. For example, the barrier layer BR may be formed of multiple layers in which one or more inorganic layers of a silicon nitride layer, a silicon oxynitride layer, a silicon oxide layer, a titanium oxide layer and an aluminum oxide layer are alternately stacked.

Thin film transistors ST1 may be disposed on the barrier layer BR. Each of the thin film transistors ST1 includes an active layer ACT1, a gate electrode G1, a source electrode S1, and a drain electrode D1.

The active layer ACT1, the source electrode S1, and the drain electrode D1 of the thin film transistors ST1 may be disposed on the barrier layer BR. The active layer ACT1 of the thin film transistor ST1 includes polycrystalline silicon, monocrystalline silicon, low-temperature polycrystalline silicon, amorphous silicon, or an oxide semiconductor. The active layer ACT1 overlapping the gate electrode G1 in the third direction (Z-axis direction, e.g. a the thickness direction of the substrate SUB) may be defined as a channel region. The source electrode S1 and the drain electrode D1 which do not overlap the gate electrode G1 in the third direction (Z-axis direction) may have conductivity by doping a silicon semiconductor or an oxide semiconductor with ions or impurities.

The gate insulating layer 130 may be disposed on the active layer ACT1, the source electrode S1, and the drain electrode D1 of the thin film transistor ST1. The gate insulating layer 130 may be formed of an inorganic layer, for example, a silicon nitride layer, a silicon oxynitride layer, a silicon oxide layer, a titanium oxide layer, or an aluminum oxide layer.

A gate electrode G1 of the thin film transistor ST1 may be arranged on the gate insulating layer 130. The gate electrode G1 may overlap the active layer ACT1 in the third direction (Z-axis direction). The gate electrode G1 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The first interlayer insulating layer 141 may be disposed on the gate electrode G1 of the thin film transistor ST1. The first interlayer insulating layer 141 may be formed of or include an inorganic layer, for example, a silicon nitride layer, a silicon oxynitride layer, a silicon oxide layer, a titanium oxide layer, or an aluminum oxide layer. In some embodiments, the first interlayer insulating layer 141 may include a plurality of inorganic layers.

A capacitor electrode CAE may be disposed on the first interlayer insulating layer 141. The capacitor electrode CAE may overlap the gate electrode G1 of the first thin film transistor ST1 in the third direction (Z-axis direction). Since the first interlayer insulating layer 141 has a predetermined dielectric constant, the capacitor electrode CAE, the gate electrode G1, and the first interlayer insulating layer 141 disposed therebetween may form a capacitor. The capacitor electrode CAE may be formed as a single layer or multiple layers, and may include molybdenum (Mo), aluminum (Al), chromium (Cr), gold (Au), titanium (Ti), nickel (Ni), neodymium (Nd) and copper (Cu) or an alloy thereof.

A second interlayer insulating layer 142 may be disposed on the capacitor electrode CAE. The second interlayer insulating layer 142 may include an inorganic layer, for example, a silicon nitride layer, a silicon oxynitride layer, a silicon oxide layer, a titanium oxide layer, or an aluminum oxide layer. The second interlayer insulating layer 142 may be formed of a plurality of inorganic layers.

The first anode connection electrode ANDE1 may be disposed on the second interlayer insulating layer 142. The first anode connection electrode ANDE1 may be connected to the drain electrode D1 of the thin film transistor ST1 through a first connection contact hole ANCT1 penetrating the gate insulating layer 130, the first interlayer insulating layer 141, and the second interlayer insulating layer 142.

The first anode connection electrode ANDE1 may be formed as a single layer or may include multiple layers of molybdenum (Mo), aluminum (Al), chromium (Cr), gold (Au), titanium (Ti), nickel (Ni), neodymium (Nd) and copper (Cu), or an alloy thereof.

A first planarization layer 160 may be disposed on the first anode connection electrode ANDE1. The first planarization layer 160 may flatten stepped regions formed as a result of the thin film transistor ST1. The first planarization layer 160 may be formed of an organic layer such as acryl resin, epoxy resin, phenolic resin, polyamide resin, polyimide resin and the like.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be formed as a single layer or include multiple layers of molybdenum (Mo), aluminum (Al), chromium (Cr), gold (Au), titanium (Ti), nickel (Ni), neodymium (Nd) and copper (Cu), or an alloy thereof.

The second planarization layer 180 may be disposed on the second anode connection electrode ANDE2. The second planarization layer 180 may be formed of an organic layer such as acryl resin, epoxy resin, phenolic resin, polyamide resin, polyimide resin and the like.

Light emitting elements LEL and a bank 190 may be disposed on the second planarization layer 180. Each of the light emitting elements LEL includes a pixel electrode 171, a light emitting layer 172, and a common electrode 173.

The pixel electrode 171 may be disposed on the second planarization layer 180. The pixel electrode 171 may be connected to a second anode connection electrode ANDE2 through a third connection contact hole ANCT3 penetrating the second planarization layer 180.

The pixel electrode 171 may be a part of a top emission structure in which light is emitted toward the common electrode 173 when viewed with respect to the light emitting layer 172. The pixel electrode 171 may be formed of a metal material having high reflectivity and have a stacked structure (Ti/Al/Ti) of aluminum and titanium, a stacked structure (ITO/Al/ITO) of aluminum and indium tin oxide (ITO), an APC alloy, and/or a stacked structure (ITO/APC/ITO) of an APC alloy and ITO. The APC alloy is an alloy of silver (Ag), palladium (Pd) and copper (Cu).

The bank 190 may be formed to partition the pixel electrode 171 on the second planarization layer 180, and may define the first to third emission areas EA1 to EA3. The bank 190 may cover the edge of the pixel electrode 171. The bank 190 may be formed of an organic layer such as acryl resin, epoxy resin, phenolic resin, polyamide resin, polyimide resin and the like.

Each of the first to third emission areas EA1 to EA3 represents an area in which the pixel electrode 171, the light emitting layer 172, and the common electrode 173 are sequentially stacked, and holes from the pixel electrode 171 and electrons from the common electrode 173 are combined with each other in the light emitting layer 172 to emit light.

The light emitting layer 172 may be disposed on the pixel electrode 171 and the bank 190. The light emitting layer 172 may include an organic material which emits light in a predetermined color. For example, the light emitting layer 172 includes a hole transporting layer, an organic material layer, and an electron transporting layer.

The common electrode 173 may be disposed on the light emitting layer 172. The common electrode 173 may cover the light emitting layer 172. The common electrode 173 may be a common layer formed in the first emission area EA1, the second emission area EA2, and the third emission area EA3. A capping layer may be formed on the common electrode 173.

In the top emission structure, the common electrode 173 may be formed of a transparent conductive material (TCO) such as ITO or IZO capable of transmitting light or a semi-transmissive conductive material such as magnesium (Mg), silver (Ag), or an alloy of magnesium (Mg) and silver (Ag). In some embodiments, when the common electrode 173 is formed of a semi-transmissive conductive material, the light emission efficiency can be increased due to a micro-cavity effect.

The encapsulation layer TFEL may be disposed on the common electrode 173. The encapsulation layer TFEL may include at least one inorganic layer to prevent oxygen or moisture from permeating into the light emitting element layer EML. In addition, the encapsulation layer TFEL may include at least one organic layer to protect the light emitting element layer EML from foreign substances such as dust. For example, the encapsulation layer TFEL includes a first encapsulation inorganic layer TFE1, an encapsulation organic layer TFE2, and a second encapsulation inorganic layer TFE3.

The first encapsulation inorganic layer TFE1 may be disposed on the common electrode 173, the encapsulation organic layer TFE2 may be disposed on the first encapsulation inorganic layer TFE1, and the second encapsulation inorganic layer TFE3 may be disposed on the encapsulation organic layer TFE2. The first inorganic encapsulation layer TFE1 and the second inorganic encapsulation layer TFE3 may be formed of or include multiple layers in which one or more inorganic layers of a silicon nitride layer, a silicon oxynitride layer, a silicon oxide layer, a titanium oxide layer and/or an aluminum oxide layer are alternately stacked. The encapsulation organic layer TFE2 may be an organic layer such as acryl resin, epoxy resin, phenolic resin, polyamide resin, polyimide resin or the like.

The touch sensing unit TSU may be disposed on the encapsulation layer TFEL. The touch sensing unit TSU includes a first touch insulating layer TINS1, the connection electrode CE, a second touch insulating layer TINS2, the driving electrode TE, the sensing electrode RE, and a third touch insulating layer TINS3.

The first touch insulating layer TINS1 may be formed of or include an inorganic layer, for example, a silicon nitride layer, a silicon oxynitride layer, a silicon oxide layer, a titanium oxide layer, or an aluminum oxide layer.

The connection electrode CE may be disposed on the first touch insulating layer TINS1. The connection electrode CE may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

The second touch insulating layer TINS2 is disposed on the first touch insulating layer TINS1 and includes the connection electrodes CE. The second touch insulating layer TINS2 may be formed of an inorganic layer, for example, a silicon nitride layer, a silicon oxynitride layer, a silicon oxide layer, a titanium oxide layer, or an aluminum oxide layer. In some embodiments, the second touch insulating layer TINS2 may be formed of an organic layer such as acryl resin, epoxy resin, phenolic resin, polyamide resin, polyimide resin and the like.

The driving electrodes TE and the sensing electrodes RE may be disposed on the second touch insulating layer TINS2. The dummy electrodes DE, the first touch driving lines TL1, the second touch driving lines TL2, and the touch sensing lines RL shown in FIG. 4 as well as the driving electrodes TE and the sensing electrodes RE may be arranged on the second touch insulating layer TINS2.

Referring to FIG. 11, a formation width DEw1 of the driving electrodes TE, the sensing electrodes RE, and the dummy electrodes DE formed in the position code pattern forming regions CPD may be greater than a formation width DEw2 of the driving electrodes TE, the sensing electrodes RE, and the dummy electrodes DE formed in the other regions (e.g. peripheral regions) where the position code patterns CP are not formed. These formation widths may be the widths of the mesh lines as viewed in plan. The mesh lines may each extend a horizontal direction. Accordingly, a width of the mesh line (e.g., mesh line width) may be a length of the mesh line in a direction perpendicular to the mesh line's extending direction.

The driving electrodes TE, the sensing electrodes RE, and the dummy electrodes DE are formed of a conductive metal electrode. The conductive metal electrode may include any one of molybdenum (Mo), aluminum (Al), chromium (Cr), gold (Au), titanium (Ti), nickel (Ni), neodymium (Nd), and copper (Cu), or an alloy thereof. The driving electrodes TE, the sensing electrodes RE, and the dummy electrodes DE are formed in a mesh structure or a net structure so as not to overlap the emission areas EA1 to EA4. Each driving electrode TE and each sensing electrode RE may partially overlap the connection electrode CE in the third direction (Z-axis direction). The driving electrode TE may be connected to the connection electrode CE through a touch contact hole TCNT1 which penetrates the second touch insulating layer TINS2.

In an example formation process, a light blocking member is coated on the entire surface of the second touch insulating layer TINS2 including the driving electrodes TE, the sensing electrodes RE, and the dummy electrodes DE. Then, the applied light blocking member is patterned in the shape of the driving electrodes TE, the sensing electrodes RE, and the dummy electrodes DE, and a preset planar code shape. For example, the light blocking member may be subjected to exposure and patterning processes using a mask, and may be formed as the position code patterns CP in preset position code pattern forming regions CPD. In this way, the position code patterns CP are formed by the patterning process in a part of the front surfaces of the driving electrodes TE, the sensing electrodes RE, and the dummy electrodes DE corresponding to the position code pattern forming regions CPD. Accordingly, a formation width CPw of the position code patterns CP may be smaller than the formation width DEw1 of the driving electrodes TE, the sensing electrodes RE, and the dummy electrodes DE formed in the position code pattern forming regions CPD.

The formation width CPw of the position code patterns CP in at least one direction may be the same as the formation width DEw2 of the driving electrodes TE, the sensing electrodes RE, and the dummy electrodes DE formed in the peripheral regions where the position code patterns CP are not formed. The formation width CPw of the position code patterns CP in at least one direction may be smaller than the formation width DEw1 of the driving electrodes TE, the sensing electrodes RE, and the dummy electrodes DE formed in the position code pattern forming regions CPD. In some embodiments, the formation width CPw of the position code patterns CP in at least one direction may be greater than the formation width DEw2 of the driving electrodes TE, the sensing electrodes RE, and the dummy electrodes DE formed in the peripheral regions where the position code patterns CP are not formed.

The light blocking member patterned with the position code patterns CP may be formed of infrared or ultraviolet absorbing materials. For example, the light blocking member may be formed of a material including an inorganic or organic pigment. The inorganic pigment may be a pigment containing at least one of carbon black, cyanine, polymethine, anthraquinone, or phthalocyanine-based compounds. In some embodiments, the organic pigment may include at least one of lactam black, perylene black, or aniline black, but is not limited thereto.

The third touch insulating layer TINS3 is formed on the driving electrodes TE and the sensing electrodes RE including the position code patterns CP. The third touch insulating layer TINS3 may flatten the stepped portion formed by the driving electrodes TE, the sensing electrodes RE, and the connection electrodes CE. The third touch insulating layer TINS3 may be formed of an inorganic layer, e.g., a silicon nitride layer, a silicon oxynitride layer, a silicon oxide layer, a titanium oxide layer, or an aluminum oxide layer. In some embodiments, the third touch insulating layer TINS3 may be formed of an organic layer such as acryl resin, epoxy resin, phenolic resin, polyamide resin, polyimide resin and the like.

A plurality of color filter layers CFL1, CFL3, and CFL4 may be formed on the touch sensing unit TSU. As an example, the plurality of color filter layers CFL1, CFL3, and CFL4 may be formed on the third touch insulating layer TINS3 to be disposed in a planar shape.

Figure 12:
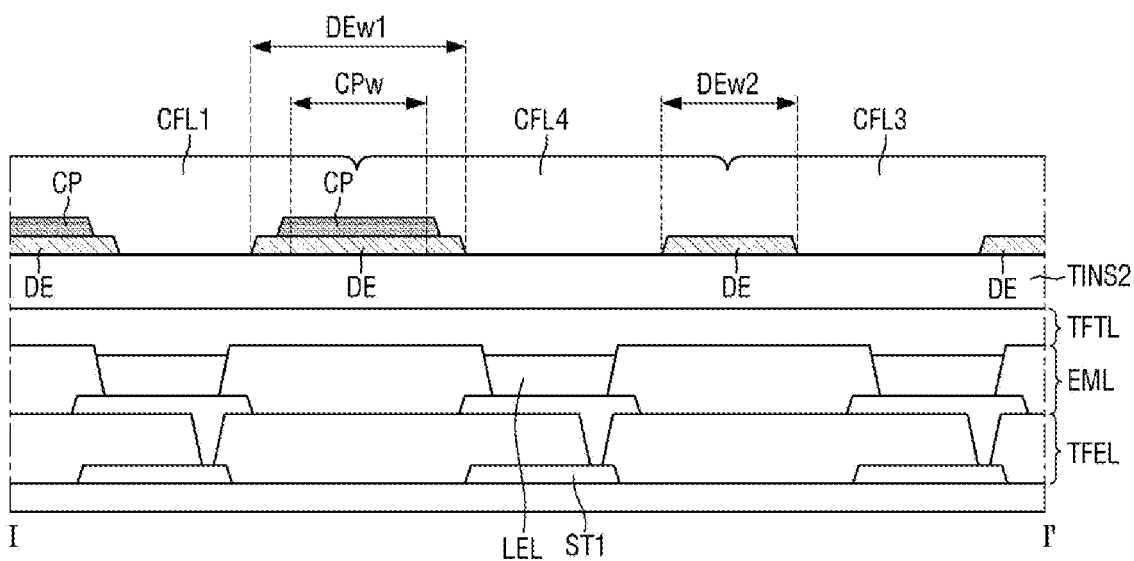
FIG. 12 is a schematic cross-sectional view that shows the cross-sectional structure taken along line I-I' of FIG. 9 according to a first embodiment.

FIG. 12 is a schematic cross-sectional view that shows the cross-sectional structure taken along line I-I' of FIG. 9 in blocks according to a first embodiment.

As described above, the plurality of color filter layers CFL1, CFL3, and CFL4 may be formed on the touch sensing unit TSU. Referring to FIG. 12, in some embodiments, the plurality of color filter layers CFL1, CFL3, and CFL4 may be formed on the second touch insulating layer TINS2 while covering the position code patterns CP.

For example, the plurality of color filter layers CFL1, CFL3, and CFL4 may be formed on the second touch insulating layer TINS2 and cover the first to fourth emission areas EA1, EA2, EA3, and EA4, the position code patterns CP, the driving electrodes TE, the sensing electrodes RE, and the dummy electrodes DE. Here, a first color filter CFL1 may be disposed in the first emission area EA1 that emits light of the first color, a second color filter may be disposed in the second emission area EA1 that emits light of the second color, and a third color filter CFL3 may be disposed in the third emission area EA3 that emits light of the third color. In addition, the second color filter may also be disposed in the fourth emission area that emits light of the second color.

In some embodiments, instead of the plurality of color filter layers CFL1, CFL3, and CFL4, a separate polarizing film may be formed on the first to fourth emission areas EA1, EA2, EA3, and EA4 as well as the position code patterns CP.

Figure 13:
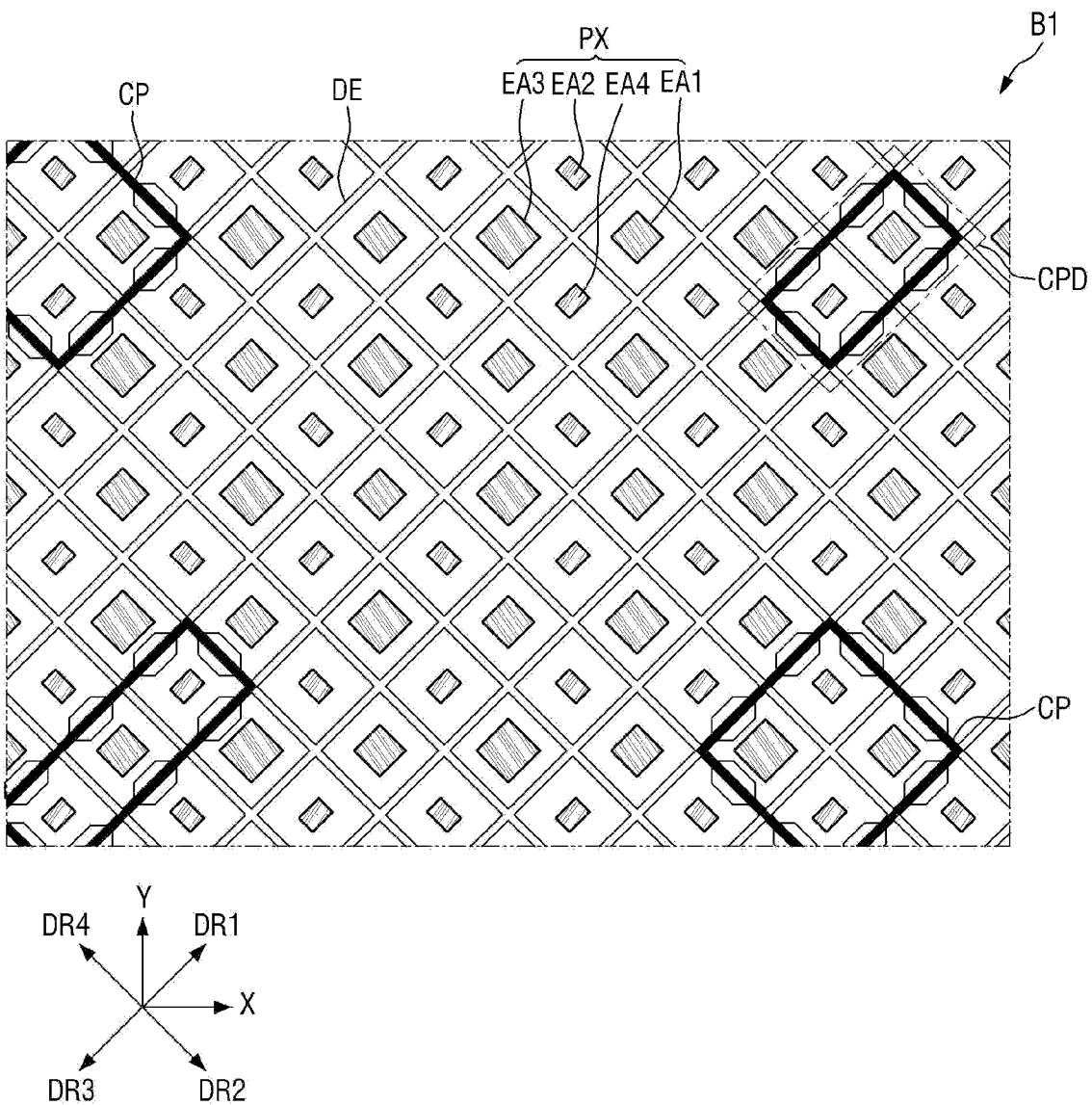
FIG. 13 is an enlarged view of area B1 in which touch electrodes and position code patterns are disposed according to a second embodiment.

FIG. 13 is an enlarged view of area B1 in which touch electrodes and position code patterns are disposed according to a second embodiment.

Referring to FIG. 13, the position code patterns CP are formed at preset intervals on the front surfaces of the dummy electrodes DE as well as on the front surfaces of the driving electrodes TE and the sensing electrodes RE.

The width in at least one direction, the size, and the length in at least one direction of the position code patterns CP may be set and formed to correspond to the size, sensing area, arrangement, and the like of the light receiver 21(b) or the optical image sensor included in the code detector 21 of the position input device 20.

The planar code shape of the position code patterns CP formed in the position code pattern forming regions CPD may have a polygonal closed loop pattern shape. The closed loop pattern shape may be at least one of a rectangular pattern, a square pattern, a rhombic pattern, a pentagonal pattern, or a hexagonal pattern, while surrounding at least one of the emission areas EA1, EA2, EA3, and EA4. Accordingly, the planar pattern shape of the driving electrodes TE, the sensing electrodes RE, and the dummy electrodes DE may also be formed in a polygonal closed loop pattern shape of at least one of a rectangular pattern, a square pattern, a rhombic pattern, a pentagonal pattern, or a hexagonal pattern, while surrounding at least one of the emission areas EA1, EA2, EA3, and EA4 to overlap the position code patterns DP.

In some embodiments, a width DEw of the driving electrodes TE, the sensing electrodes RE, and the dummy electrodes DE that correspond to the planar code shapes of the position code patterns CP is greater than the width CPw of the position code patterns CP. Accordingly, external light may be reflected in a front direction of the driving electrodes TE and the sensing electrodes RE, and the dummy electrodes DE, which protrude outwards from the position code patterns CP in a plan view in at least one lateral direction or the vertical direction of the position code pattern CP.

The driving electrodes TE, the sensing electrodes RE, and the dummy electrodes DE that correspond to the planar code shapes of the position code patterns CP may include a protrusion in a polygonal shape. The polygonal protrusion may have at least one of a triangular shape, a square shape, or a trapezoidal shape, protruding in at least one lateral direction or the vertical direction of the position code pattern CP. Here, the width DEw of the electrodes TE, RE, and DE including the width of the polygonal protrusion may be greater than the width CPw of the position code patterns CP, as seen in FIG. 13.

In some embodiments, adjacent position code patterns CP may be formed with differing dimensions from one another. For example, the area of each of the position code patterns CP, the width thereof in at least one direction, the length thereof in at least one direction, and the size thereof in at least one direction may be formed differently from those of other adjacent position code patterns CP. Accordingly, the area, the width in at least one direction, the length in at least one direction and the size in at least one direction of each of the driving electrodes TE, the sensing electrodes RE, and the dummy electrodes DE, that respectively correspond to the planar code shapes of the position code patterns CP, may be formed differently from those of other adjacent driving electrodes TE, sensing electrodes RE, and dummy electrodes DE to match their corresponding position code patterns CP.

In addition, the width or size of the driving electrodes TE, the sensing electrodes RE, and the dummy electrodes DE, that respectively correspond to the planar code shapes of the position code patterns CP, in at least one of the X-axis and Y-axis directions and the first to fourth directions DR1 to DR4, may be formed to be greater than the widths or sizes of the position code patterns CP in the X-axis and Y-axis directions and the first to fourth directions DR1 to DR4. FIG. 13 illustrates an example in which the widths of the driving electrodes TE, the sensing electrodes RE, and the dummy electrodes DE, that respectively correspond to the planar code shapes of the position code patterns CP, in the first to fourth directions DR1 to DR4, are formed to be greater than the widths of the position code patterns CP in the first to fourth directions DR1 to DR4.

As described above, the width of the driving electrodes TE, the sensing electrodes RE, and the dummy electrodes DE, that respectively correspond to the planar code shapes of the position code patterns CP, may be formed to be greater than the width of the position code patterns CP by more than a preset amount, thereby reflecting the external light on the front surface, similarly to the peripheral regions where the position code patterns CP are not formed. Accordingly, the visibility of the position code patterns CP to the user may be reduced.

Figure 14:
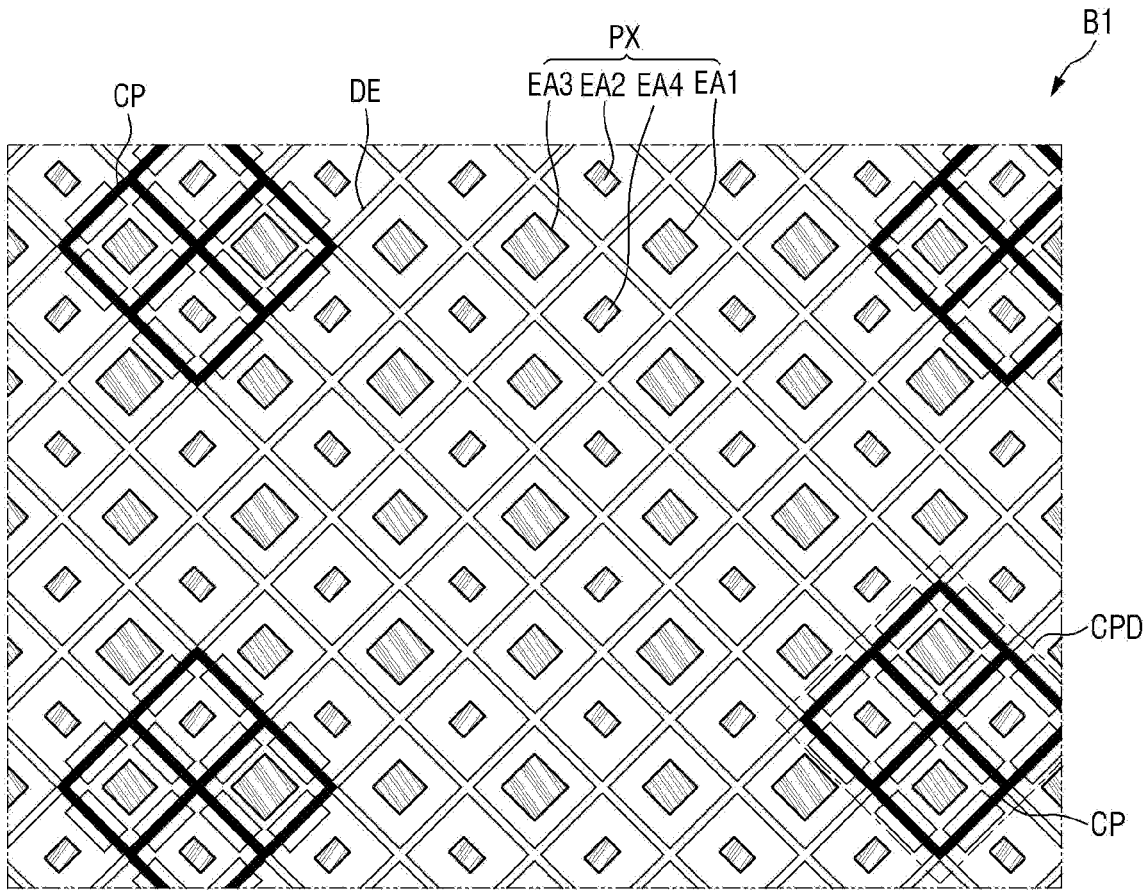
FIG. 14 is an enlarged view of area B1 in which touch electrodes and position code patterns are disposed according to a third embodiment.

FIG. 14 is an enlarged view of area B1 in which touch electrodes and position code patterns are disposed according to a third embodiment.

Referring to FIG. 14, the planar code shape of the position code patterns CP may be formed in a mesh pattern shape in plan view by surrounding the spaces between the plurality of emission areas EA1, EA2, EA3, and EA4 and the outer sides thereof. Accordingly, the planar pattern shape of the driving electrodes TE and the sensing electrodes RE, and the dummy electrodes DE, that respectively correspond to the planar code shapes of the position code patterns CP, may be formed in a mesh pattern shape in plan view by surrounding the spaces between the plurality of emission areas EA1, EA2, EA3, and EA4 formed in the position code pattern forming regions CPD and the outer sides thereof.

As described above, the area of each of the position code patterns CP, the width thereof in at least one direction, the length thereof in at least one direction, and the size thereof in at least one direction may be formed differently from those of other adjacent position code patterns CP. Accordingly, the area, the width in at least one direction, the length in at least one direction, and the size in at least one direction of each of the driving electrodes TE, the sensing electrodes RE, and the dummy electrodes DE, that respectively correspond to the planar code shapes of the position code patterns CP, may be formed differently from those of other adjacent driving electrodes TE, sensing electrodes RE, and dummy electrodes DE.

In addition, the width or size of the driving electrodes TE, the sensing electrodes RE, and the dummy electrodes DE, that respectively correspond to the planar code shapes of the position code patterns CP, in at least one direction of the X-axis and Y-axis directions and the first to fourth directions DR1 to DR4 may be formed to be greater than the widths or sizes of the position code patterns CP in the X-axis and Y-axis directions and the first to fourth directions DR1 to DR4. In this case, the driving electrodes TE, the sensing electrodes RE, and the dummy electrodes DE formed to respectively correspond to the planar code shapes of the position code patterns CP may protrude in at least one lateral direction or the vertical direction of the position code pattern CP while having a polygonal shape of at least one of a triangular shape, a square shape, or a trapezoidal shape.

Figure 15:
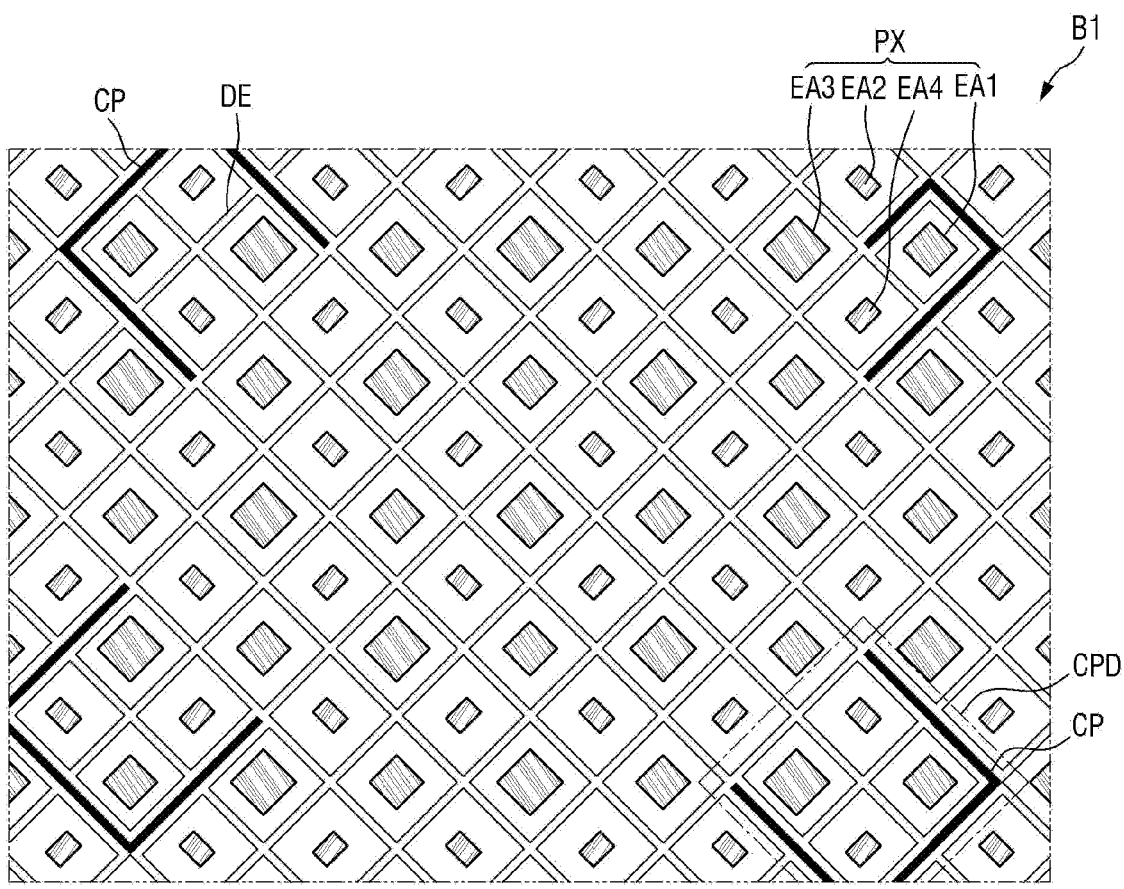
FIG. 15 is an enlarged view of area B1 in which touch electrodes and position code patterns are disposed according to a fourth embodiment.
Figure 15:
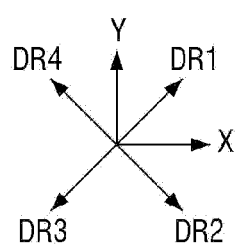

FIG. 15 is an enlarged view of area B1 in which touch electrodes and position code patterns are disposed according to a fourth embodiment.

Referring to FIG. 15, the planar code shape of the position code patterns CP may be an open loop pattern shape that partially surrounds the outer sides of at least one emission area EA1, EA2, EA3, EA4. Accordingly, the planar pattern shape of the driving electrodes TE and the sensing electrodes RE, and the dummy electrodes DE, that respectively correspond to the planar code shapes of the position code patterns CP, may also be an open loop pattern shape partially surrounding the outer sides of at least one emission area EA1, EA2, EA3, EA4 formed in the position code pattern forming regions CPD.

The width or size of the driving electrodes TE, the sensing electrodes RE, and the dummy electrodes DE, that respectively correspond to the planar code shapes of the position code patterns CP, in at least one of the X-axis and Y-axis directions and the first to fourth directions DR1 to DR4 may be formed to be greater than the widths or sizes of the position code patterns CP in the X-axis and Y-axis directions and the first to fourth directions DR1 to DR4. As such, the width of the driving electrodes TE, the sensing electrodes RE, and the dummy electrodes DE, that respectively correspond to the planar code shapes of the position code patterns CP, may be formed to be greater than the width of the position code patterns CP by more than a preset amount, thereby reflecting the external light on the front surface, similarly to the peripheral regions where the position code patterns CP are not formed. Accordingly, the visibility of the position code patterns CP to the user may be reduced.

In some embodiments, the position input device 20 may emit infrared light to the display unit DU and continuously generate the shape data of the position code patterns CP according to the amount and type of the infrared light reflected from the display unit DU. In addition, the position input device 20 may identify the structure and shape of the position code patterns CP and extract data codes corresponding to the structure and shape of the position code patterns CP. The position input device 20 may combine the extracted data codes and may generate and transmit position coordinate data corresponding to the combined data codes.

Figure 16:
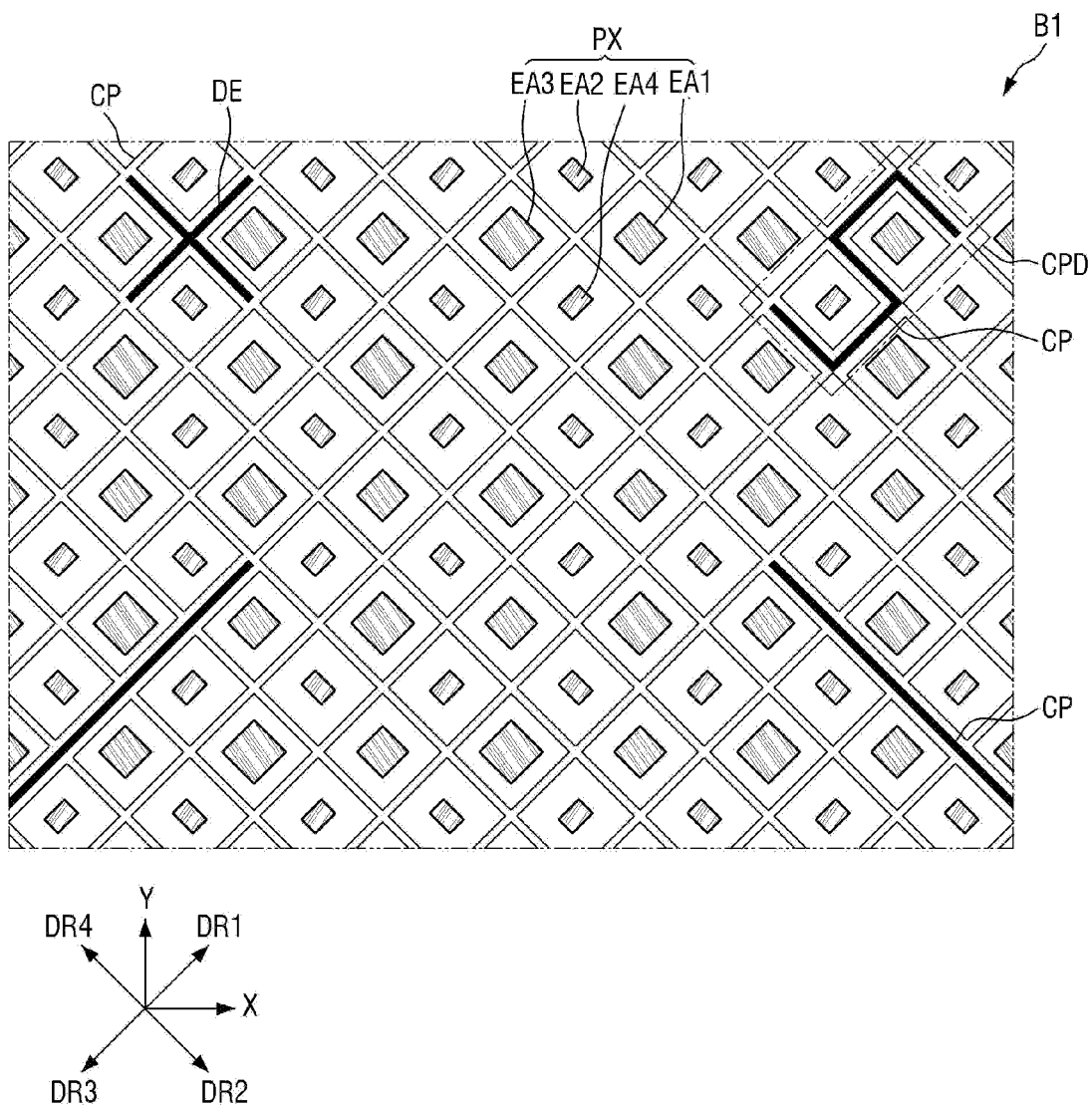
FIG. 16 is an enlarged view of area B1 in which touch electrodes and position code patterns are disposed according to a fifth embodiment.

FIG. 16 is an enlarged view of area B1 in which touch electrodes and position code patterns are disposed according to a fifth embodiment.

Referring to FIG. 16, the planar code shape of the position code patterns CP may be a pattern shape of at least one of a straight or curved shape of a preset length, a cross pattern shape, or an irregular polygonal pattern shape. Accordingly, the planar pattern shape of the driving electrodes TE, the sensing electrodes RE, and the dummy electrodes DE that respectively correspond to the planar code shapes of the position code patterns CP may also be a pattern shape of at least one of a straight or curved shape of a preset length, a cross pattern shape, or an irregular polygonal pattern shape having a predetermined curvature.

The area of each of the position code patterns CP, the width thereof in at least one direction, the length thereof in at least one direction, and the size thereof in at least one direction may be formed differently from those of other position code patterns CP. In addition, the width of the driving electrodes TE, the sensing electrodes RE, and the dummy electrodes DE, that respectively correspond to the planar code shapes of the position code patterns CP, are formed to be greater than the width of the position code patterns CP by more than a preset amount.

The width of the driving electrodes TE, the sensing electrodes RE, and the dummy electrodes DE, that respectively correspond to the planar code shapes of the position code patterns CP, may be formed to be greater than the width of the position code patterns CP by more than a preset amount, thereby reflecting the external light on the front surface, similarly to the peripheral regions where the position code patterns CP are not formed. Accordingly, the visibility of the position code patterns CP to the user may be reduced.

Figure 17:
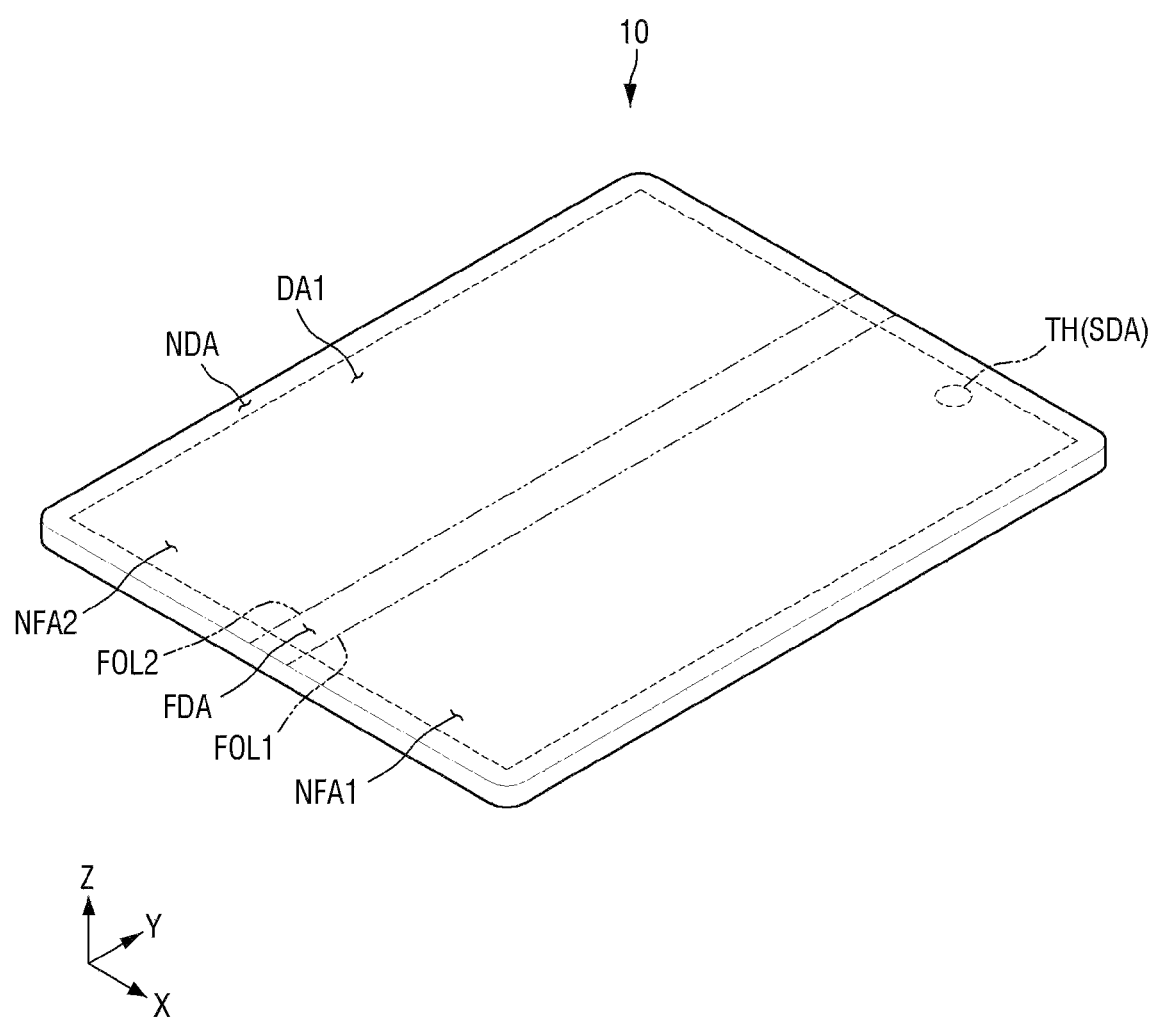
FIGS. 17 and 18 are perspective views that illustrate a display device according to another embodiment of the present disclosure.
Figure 18:
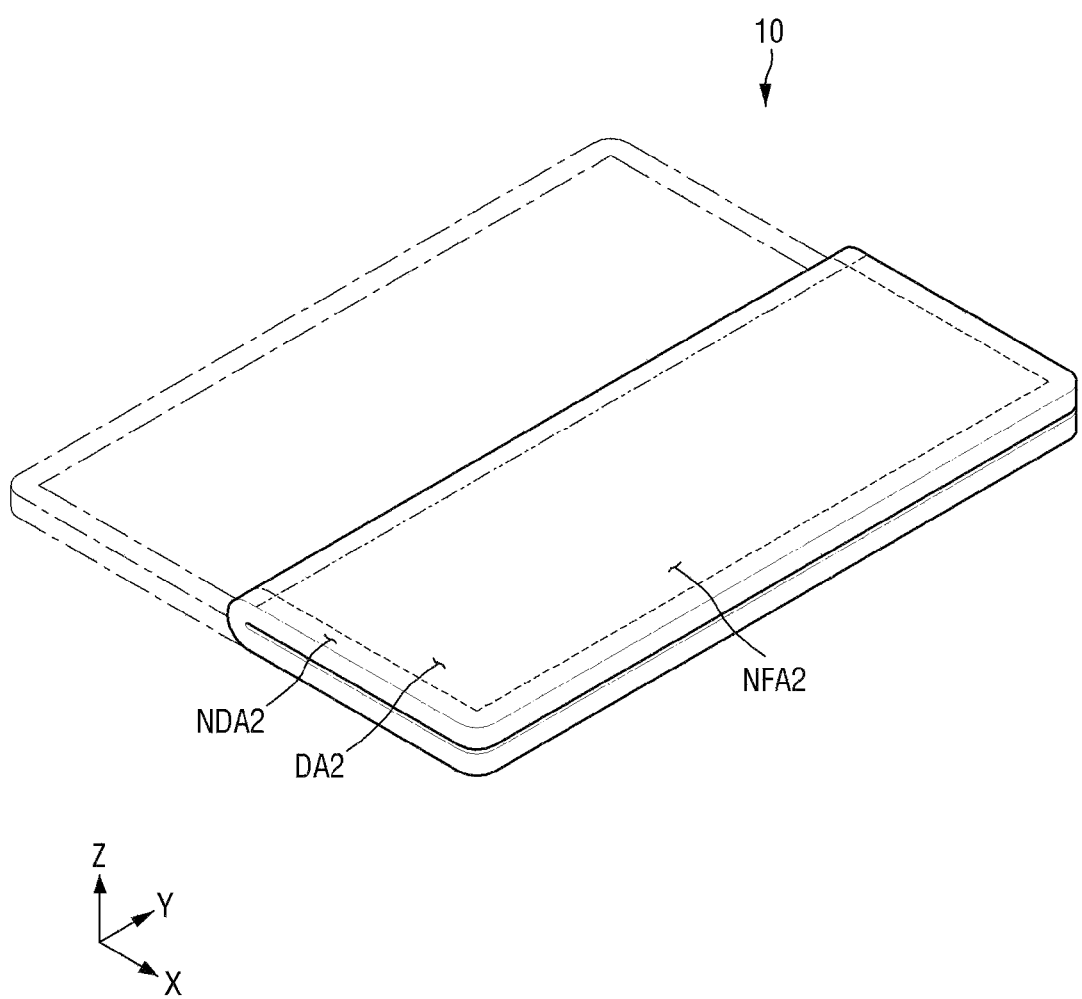

FIGS. 17 and 18 are perspective views that illustrate a display device according to another embodiment of the present disclosure.

FIGS. 17 and 18 illustrate the display device 10 as a foldable display device that is configured to fold in the first direction (X-axis direction) about a second direction axis (Y-axis). The display device 10 may function in a folded state and in an unfolded state. The display device 10 may be folded in an in-folding manner in which the front surface is disposed on the inside thereof. When the display device 10 is bent or folded in the in-folding manner, the front surfaces of the display device 10 may be disposed to face each other. In some embodiments, the display device 10 may be folded in an out-folding manner in which the front surface is disposed on the outside thereof. When the display device 10 is bent or folded in an out-folding manner, the rear surfaces of the display device 10 may be disposed to face each other.

A first non-folding area NFA1 may be disposed on one side, for example, the right side of a folding area FDA. A second non-folding area NFA2 may be disposed on the other side, for example, the left side of the folding area FDA. The touch sensing unit TSU according to an embodiment of the present disclosure may be disposed on both the first non-folding area NFA1 and the second non-folding area NFA2.

A first folding line FOL1 and a second folding line FOL2 extend in the second direction (Y-axis direction), and the display device 10 may be folded in the first direction (X-axis direction). The first folding line FOL1 may define an inner side of the first non-folding area NFA1, and the second folding line FOL2 may define an inner side of the second non-folding area NFA2. Accordingly, the length of the display device 10 in the first direction (X-axis direction) may be reduced to approximately half, so that a user can conveniently carry the display device 10.

The extension direction of the first folding line FOL1 and the extension direction of the second folding line FOL2 are not limited to the second direction (Y-axis direction). For example, the first folding line FOL1 and the second folding line FOL2 may extend in the first direction (X-axis direction), and the display device 10 may be folded in the second direction (Y-axis direction). In this case, the length of the display device 10 in the second direction (Y-axis direction) may be reduced to approximately half. In some embodiments, the first folding line FOL1 and the second folding line FOL2 may extend in the diagonal direction of the display device 10 between the first direction (X-axis direction) and the second direction (Y-axis direction). In this case, the display device 10 may be folded in a triangular shape.

When the first folding line FOL1 and the second folding line FOL2 extend in the second direction (Y-axis direction), the length of the folding area FDA in the first direction (X-axis direction) may be less than the length thereof in the second direction (Y-axis direction). Further, the length of the first non-folding area NFA1 in the first direction (X-axis direction) may be longer than the length of the folding area FDA in the first direction (X-axis direction). The length of the second non-folding area NFA2 in the first direction (X-axis direction) may also be longer than the length of the folding area FDA in the first direction (X-axis direction).

The first display area DA1 may be disposed on the front surface of the display device 10. The first display area DA1 may overlap the folding area FDA, the first non-folding area NFA1, and the second non-folding area NFA2. Accordingly, when the display device 10 is unfolded, an image may be displayed toward the front side thereof in the folding area FDA, the first non-folding area NFA1, and the second non-folding area NFA2 of the display device 10.

Referring to FIG. 18, the second display area DA2 may be disposed on the rear surface of the display device 10. The second display area DA2 may overlap the second non-folding area NFA2. Therefore, when the display device 10 is folded, an image may be displayed toward the front side thereof in the second non-folding area NFA2 of the display device 10.

FIGS. 17 and 18 illustrate an example in which a through hole TH having a camera SDA formed therein is disposed in the first non-folding area NFA1, but the present disclosure is not limited thereto. The through hole TH or the camera SDA may be disposed in the second non-folding area NFA2 or the folding area FDA.

Figure 19:
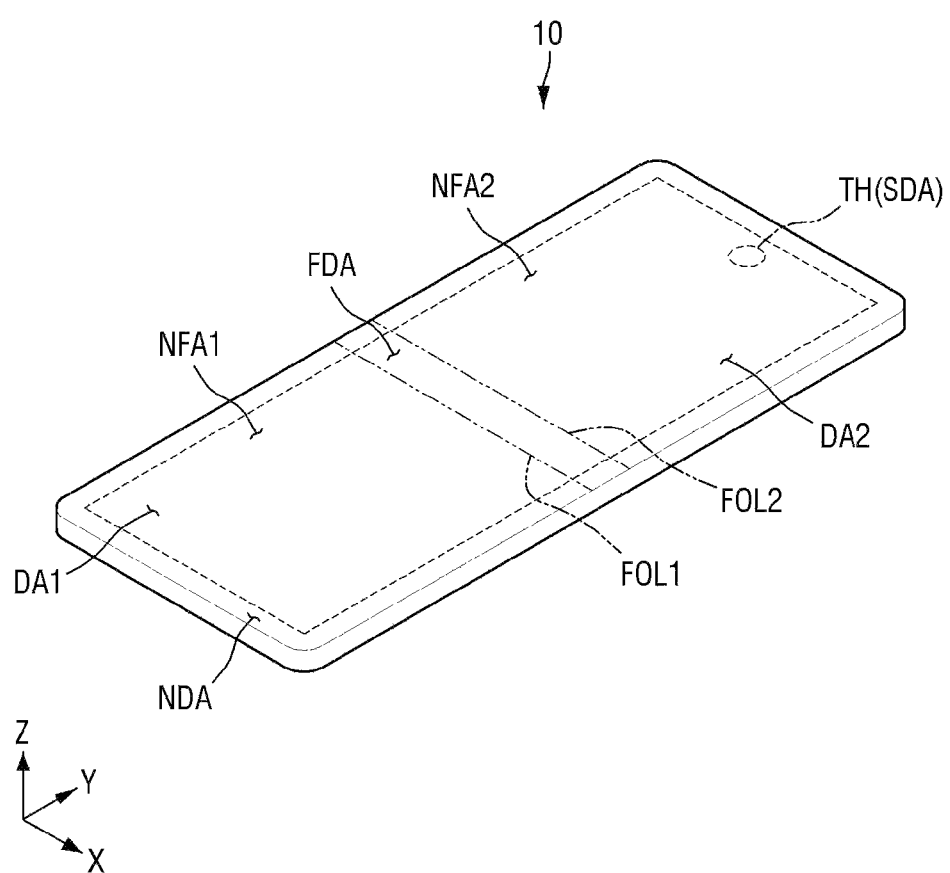
FIGS. 19 and 20 are perspective views that illustrate a display device according to still another embodiment of the present disclosure.
Figure 20:
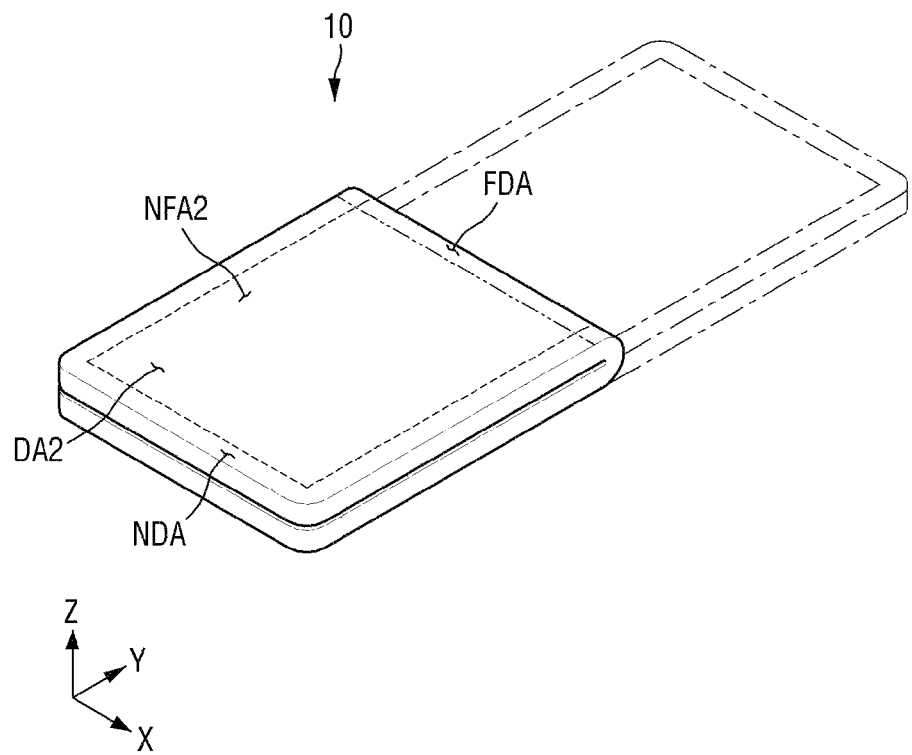

FIGS. 19 and 20 are perspective views that illustrate a display device according to still another embodiment of the present disclosure.

FIGS. 19 and 20 illustrate the display device 10 as a foldable display device that is folded in the second direction (Y-axis direction). The display device 10 may function in both a folded state and an unfolded state. The display device 10 may be folded in an in-folding manner in which the front surface is disposed on the inside thereof. When the display device 10 is bent or folded in the in-folding manner, the front surfaces of the display device 10 may be disposed to face each other. In some embodiments, the display device 10 may be folded in an out-folding manner in which the front surface is disposed on the outside thereof. When the display device 10 is bent or folded in an out-folding manner, the rear surfaces of the display device 10 may be disposed to face each other.

The display device 10 may include a folding area FDA, the first non-folding area NFA1, and the second non-folding area NFA2. The folding area FDA may be an area in which the display device 10 is folded, e.g., may have a non-zero curvature in the folded state, and the first and second non-folding areas NFA1 and NFA2 may be areas in which the display device 10 is not folded. The first non-folding area NFA1 may be disposed on one side (e.g., a lower side) of the folding area FDA. The second non-folding area NFA2 may be disposed on the other side (e.g., an upper side) of the folding area FDA.

The touch sensing unit TSU according to an embodiment of the present disclosure may be disposed on each of the first non-folding area NFA1 and the second non-folding area NFA2.

In some embodiments, the folding area FDA may be a curved area with a predetermined curvature at a first folding line FOL1 and a second folding line FOL2. The first folding line FOL1 may be the boundary between the folding area FDA and the first non-folding area NFA1, and the second folding line FOL2 may be the boundary between the folding area FDA and the second non-folding area NFA2.

The first folding line FOL1 and the second folding line FOL2 may extend in the first direction (X-axis direction) as shown in FIGS. 19 and 20. In this case, the display device 10 may be folded in the second direction (Y-axis direction). Accordingly, the length of the display device 10 in the second direction (Y-axis direction) may be reduced to approximately half, so that a user can conveniently carry the display device 10.

The extension direction of the first folding line FOL1 and the extension direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction), similar to FIGS. 17-18. In this case, the length of the display device 10 in the first direction (X-axis direction) may be reduced to approximately half. In some embodiments, the first folding line FOL1 and the second folding line FOL2 may extend in the diagonal direction of the display device 10 between the first direction (X-axis direction) and the second direction (Y-axis direction). In this case, the display device 10 may be folded in a triangular shape.

When the first folding line FOL1 and the second folding line FOL2 extend in the first direction (X-axis direction) as shown in FIGS. 19 and 20, the length of the folding area FDA in the second direction (Y-axis direction) may be less than the length of the folding area FDA in the first direction (X-axis direction). Further, the length of the first non-folding area NFA1 in the second direction (Y-axis direction) may be longer than the length of the folding area FDA in the second direction (Y-axis direction). The length of the second non-folding area NFA2 in the second direction (Y-axis direction) may be longer than the length of the folding area FDA in the second direction (Y-axis direction).

The first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed toward the front side thereof in the folding area FDA, the first non-folding area NFA1, and the second non-folding area NFA2 of the display device 10.

The second display area DA2 may be disposed on the rear surface of the display device 10. The second display area DA2 may overlap the second non-folding area NFA2. Therefore, when the display device 10 is folded, an image may be displayed toward the front side thereof in the second non-folding area NFA2 of the display device 10.

FIGS. 19 and 20 illustrate that the through hole TH having the camera SDA formed therein is disposed in the second non-folding area NFA2, but the present disclosure is not limited thereto. The through hole TH may be disposed in the first non-folding area NFA1 or the folding area FDA. In some embodiments, the through hole may be disposed on a rear surface of the display device 10.

Embodiments of the present disclosure provide a display device with a plurality of position code patterns disposed on a display panel thereof. The position code patterns may allow an external input device, such as an electronic stylus or pen, to communicate with the display device and provide accurate positional input information without the expensive computation or correction associated with capacitance methods. Further, touch electrodes and dummy electrodes disposed underneath the position code patterns may have increased sizes in various planar dimensions, thereby reducing visibility of the position code patterns and increasing display quality.

In concluding the detailed description, those skilled in the art will appreciate that many variations and modifications can be made to the embodiments without substantially departing from the principles of the present inventive concept. Therefore, the disclosed embodiments of the inventive concept are used in a generic and descriptive sense only and not for purposes of limitation.

What is claimed is:
1. A display device comprising:
a display panel;

a display unit comprising a plurality of emission areas, wherein the display unit is disposed on the display panel;
a plurality of touch electrodes disposed between the plurality of emission areas,
wherein the plurality of touch electrodes is configured to sense a touch input; and,
a plurality of position code patterns disposed in position code pattern forming regions on the display panel, wherein each position code pattern of the plurality of position code patterns overlaps a corresponding touch electrode of the plurality of touch electrodes in a corresponding position code pattern forming region,
wherein a width in a horizontal direction of the touch electrodes formed in the position code pattern forming regions is greater than a width in the horizontal direction of the position code patterns overlapping a front surface thereof,
wherein the horizontal direction is parallel to an extending plane of the display panel, and
wherein a formation width of a first touch sensor area formed in position code patterns is greater than a formation width of a second touch sensor area formed in peripheral regions,
wherein the first touch sensor area and the second touch sensor area each comprises a plurality of driving electrodes, a plurality of sensing electrodes, and a plurality of dummy electrodes.

2. The display device of claim 1, wherein the plurality of emission areas are arranged in a stripe structure or in a pentile matrix structure,
the plurality of driving electrodes, the plurality of sensing electrodes, and the plurality of dummy electrodes are formed into a mesh structure, the mesh structure comprising mesh lines extending in spaces between each of the plurality of emission areas and outer sides thereof, and
wherein the position code patterns overlap the mesh structure in the position code pattern forming regions.

3. The display device of claim 2, wherein an area of the touch electrodes formed in the position code pattern forming region is greater than an area of the position code patterns formed to overlap the front surface thereof.

4. The display device of claim 3, wherein a formation width in at least one direction of the position code patterns formed in the position code forming region is the same as a mesh line width of the plurality of touch electrodes formed in peripheral regions where the position code patterns are not formed.

5. The display device of claim 3, wherein a formation width in at least one direction of the position code patterns formed in the position code pattern forming regions is less than a mesh line width of the touch electrodes formed in the position code pattern forming regions, and is greater than a mesh line width of the plurality of touch electrodes formed in peripheral regions where the position code patterns are not formed.

6. The display device of claim 3, wherein a width in at least one of X-axis and Y-axis directions and first through fourth directions of the touch electrodes formed in the position code pattern forming regions is greater than widths in the X-axis and Y-axis directions and the first through fourth directions of the position code patterns formed on the front surface thereof,
the X-axis and Y-axis directions are horizontal directions perpendicular to each other and parallel to the extending plane of the display panel, and wherein the first through fourth directions are diagonal directions with respect to the X-axis and Y-axis directions.

7. The display device of claim 6, wherein a planar code pattern shape of the position code patterns is a rectangular pattern, a square pattern, a rhombic pattern, a pentagonal pattern, or a hexagonal pattern, and
wherein a planar shape of the touch electrodes formed in the position code pattern forming regions is the rectangular pattern, square pattern, rhombic pattern, pentagonal pattern, or hexagonal pattern, and overlaps the position code patterns.

8. The display device of claim 6, wherein a planar code pattern shape of the position code patterns has a polygonal closed loop pattern shape of a rectangular pattern, a square pattern, a rhombic pattern, a pentagonal pattern, or a hexagonal pattern that surrounds at least one of the emission areas, and
wherein the touch electrodes formed in the position code pattern forming regions are formed in a polygonal closed loop pattern shape of the rectangular pattern, square pattern, rhombic pattern, pentagonal pattern, or hexagonal pattern that surrounds at least one of the emission areas and overlaps the position code patterns.

9. The display device of claim 6, wherein the touch electrodes formed in the position code pattern forming regions comprise protrusions protruding in at least one horizontal direction,
the protrusions are formed in a polygonal shape of a triangular shape, a square shape, or a trapezoidal shape, and
wherein a width of the touch electrodes includes a width of the protrusions and is greater than a width of the position code patterns.

10. The display device of claim 6, wherein a planar code pattern shape of the position code patterns has a planar mesh pattern shape comprising mesh lines extending in spaces between the plurality of emission areas formed in the position code pattern forming regions and outer sides thereof, and
wherein the touch electrodes formed in the position code pattern forming regions are formed in a planar mesh pattern shape comprising mesh lines extending in spaces between the plurality of emission areas and outer sides thereof to overlap the position code patterns.

11. The display device of claim 6, wherein a planar code pattern shape of the position code patterns has an open loop pattern shape partially surrounding outer sides of at least one emission area formed in the position code pattern forming regions, and
wherein the touch electrodes formed in the position code pattern forming regions are formed in an open loop pattern shape partially surrounding the outer sides of the at least one emission area to overlap the position code patterns.

12. The display device of claim 6, wherein a planar code pattern shape of the position code patterns has a pattern shape of a straight or curved shape of a preset length, a cross pattern shape, or an irregular polygonal pattern shape, the planar code pattern shape extending between the plurality of emission areas formed in the position code pattern forming regions, and
wherein the touch electrodes formed in the position code pattern forming regions are formed in a pattern shape of a straight or curved shape of a preset length, a cross pattern shape, or an irregular polygonal pattern shape, the planar code pattern shape extending between the plurality of emission areas to overlap the position code patterns.

13. The display device of claim 6, wherein dimensions of each of the position code patterns, including an area thereof, a width thereof in at least one direction, a length thereof in at least one direction, and a size thereof in at least one direction are different from dimensions of other adjacent position code patterns, and
wherein dimensions of each of the touch electrodes formed in the position code pattern forming regions, including an area, a width in at least one direction, a length in at least one direction, and a size in at least one direction are different from dimensions of the touch electrodes formed in other adjacent position code pattern forming regions.

14. A position input system comprising:
a display device configured to display an image; and
a position input device configured to input position coordinate data to the display device,
wherein the display device comprises:
  a display panel;
  a display unit comprising a plurality of emission areas, wherein the display unit is disposed on the display panel;
  a plurality of touch electrodes disposed between the plurality of emission areas, wherein the plurality of touch electrodes is configured to sense a touch input and; and
  a plurality of position code patterns disposed in position code pattern forming regions on the display panel, wherein each of the plurality of position code patterns is disposed to overlap a corresponding touch electrode of the plurality of touch electrodes in a corresponding position code pattern forming region,
  wherein a width in at least one horizontal direction of the touch electrodes formed in the position code pattern forming regions is greater than a width in at least one horizontal direction of the position code patterns overlapping a front surface thereof, and wherein the horizontal direction is parallel to an extending plane of the display panel, and
  wherein a formation width of a first touch sensor area formed in position code patterns is greater than a formation width of a second touch sensor area formed in peripheral regions.

15. The position input system of claim 14, wherein the position input device comprises:
a code detector configured to detect the position code patterns;
a code processor configured to receive shape data of the position code patterns from the code detector, extract data codes corresponding to a shape of the position code patterns, and generate the position coordinate data corresponding to the data codes; and
a communication module configured to transmit the position coordinate data to the display device.

16. The position input system of claim 14, wherein the plurality of emission areas are arranged in a stripe structure or in a pentile matrix structure,
the first touch sensor area and the second touch sensor area each comprises a plurality of driving electrodes, a plurality of sensing electrodes, and a plurality of dummy electrodes, and
the plurality of driving electrodes, the plurality of sensing electrodes, and the plurality of dummy electrodes are formed in a mesh structure including mesh lines extending into spaces between all the plurality of emission areas and outer sides thereof.

17. The position input system of claim 16, wherein an area of the touch electrodes formed in the position code pattern forming regions is greater than an area of the position code patterns formed to overlap the front surface thereof.

18. The position input system of claim 17, wherein a formation width in at least one direction of the position code patterns formed in the position code pattern forming regions is the same as a mesh line width of the plurality of touch electrodes formed in peripheral regions where the position code patterns are not formed.

19. The position input system of claim 17, wherein a formation width in at least one direction of the position code patterns formed in the position code pattern forming regions is less than a mesh line width of the touch electrodes formed in the position code pattern forming regions, and is greater than a mesh line width of the plurality of touch electrodes formed in peripheral regions where the position code patterns are not formed.

20. The position input system of claim 17, wherein a width in at least one of X-axis and Y-axis directions and first through fourth directions of the touch electrodes formed in the position code pattern forming regions is greater than widths in the X-axis and Y-axis directions and the first through fourth directions of the position code patterns formed on the front surface thereof,
the X-axis and Y-axis directions are horizontal directions perpendicular to each other and parallel to the extending plane of the display panel, and wherein the first through fourth directions are diagonal directions with respect to the X-axis and Y-axis directions.

21. A position input system comprising:
a display device including a display unit and a touch unit; and
a position input device,
wherein the display unit comprises:
  a display panel comprising a plurality of pixel units; and
  a communication unit configured to communicate with the position input device, and
wherein the touch unit comprises:
  a plurality of touch electrodes formed in a mesh structure, wherein the pixel units are disposed within openings of the mesh structure; and
  a plurality of position code patterns disposed within position code pattern forming regions, wherein each position code pattern of the plurality of position code patterns is disposed to overlap a corresponding touch electrode of the plurality of touch electrodes in a thickness direction, and wherein a width of each position code pattern is less than a width of the corresponding touch electrode,
wherein the position input device comprises:
  a light emitter configured to emit infrared light onto the plurality of position code patterns;
  a light receiver configured to sense infrared light reflected from the position code patterns and generate an image signal; and
  a code processor configured to generate positional data based the image signal and output the positional data to the display unit,
wherein the display unit updates a displayed image based on the positional data received from the position input device, and wherein a formation width of a first touch sensor area formed in position code patterns is greater than a formation width of a second touch sensor area formed in peripheral regions.

* * * * *